(12) United States Patent
Ayers et al.

(10) Patent No.: US 10,814,462 B2
(45) Date of Patent: Oct. 27, 2020

(54) TOOLS FOR RELEASING CABLE TIES

(71) Applicant: THE BOEING COMPANY, Chicago, IL (US)

(72) Inventors: Aaron Robert Ayers, Seattle, WA (US); Christine Mary Anderson, Seattle, WA (US); David Scott Wright, Seattle, WA (US); Donald Wayne Coffland, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 386 days.

(21) Appl. No.: 15/425,457

(22) Filed: Feb. 6, 2017

(65) Prior Publication Data

US 2018/0222024 A1 Aug. 9, 2018

(51) Int. Cl.
| | |
|---|---|
| *B65B 69/00* | (2006.01) |
| *B25B 25/00* | (2006.01) |
| *B65B 13/02* | (2006.01) |
| *F16B 2/08* | (2006.01) |

(52) U.S. Cl.
CPC ............ *B25B 25/00* (2013.01); *B65B 13/027* (2013.01); *B65B 69/0025* (2013.01); *F16B 2/08* (2013.01); *Y10T 29/49824* (2015.01)

(58) Field of Classification Search
CPC ... B25B 25/00; B65B 13/027; B65B 69/0025; Y10T 29/49947; Y10T 29/49824; Y10T 29/49828; Y10T 29/49826; F16B 2/08; B23P 19/04
See application file for complete search history.

(56) References Cited

U.S. PATENT DOCUMENTS

| | | | |
|---|---|---|---|
| 3,168,119 A | | 2/1965 | Schwester et al. |
| 3,492,854 A | * | 2/1970 | Eppler ................. H01R 43/042 140/113 |
| 3,854,202 A | * | 12/1974 | Cortese ................ H02G 1/1214 30/91.2 |
| 4,188,023 A | | 2/1980 | Whaley et al. |
| 4,459,717 A | | 7/1984 | Halstead |

(Continued)

OTHER PUBLICATIONS

Panduit, Model GS4H, http://www.panduit.com/wcs/Satellite?c=Page&childpagename=Panduit_Global%2FPG_Layout&cid=1345565612156&locale=en_us&pagename=PG_Wrapper&item_id=GS4H, Jul. 31, 2015, 1 page, Panduit.

(Continued)

*Primary Examiner* — David P Bryant
*Assistant Examiner* — Ruth G Hidalgo-Hernandez
(74) *Attorney, Agent, or Firm* — Joseph F. Harding; The Small Patent Law Group LLC

(57) ABSTRACT

A tool comprises a chassis, a slider, a first jaw, a second jaw and a compression spring. The chassis comprises a distal end, a proximal end, opposite the distal end, and a distal interior wall, facing the proximal end of the chassis. The slider comprises a slider opening and is coupled to the chassis. The first jaw is coupled to the chassis and is located between the distal interior wall of the chassis and the slider. The second jaw is coupled to the chassis and is located between the first jaw and the slider. The compression spring is located between the first jaw and the second jaw. When the slider is moved relative to the chassis, the first jaw is stationary relative to the chassis, and the second jaw moves relative to the chassis and is stationary relative to the slider.

20 Claims, 12 Drawing Sheets

(56) References Cited

U.S. PATENT DOCUMENTS

| | | | |
|---|---|---|---|
| 5,009,134 A | 4/1991 | Sorensen et al. | |
| 5,309,802 A | 5/1994 | Mammosser | |
| 6,276,059 B1 | 8/2001 | Kan | |
| 7,444,744 B2 * | 11/2008 | Caveney | H01R 43/0421 |
| | | | 29/566.4 |
| 8,104,180 B2 | 1/2012 | Swinford | |
| 10,112,547 B2 | 10/2018 | Detweiler et al. | |
| 2010/0206148 A1 | 8/2010 | Reyes | |
| 2011/0265332 A1 | 11/2011 | Cornell et al. | |
| 2013/0139392 A1 | 6/2013 | Wright et al. | |

OTHER PUBLICATIONS

Final Office Action dated Nov. 4, 2019 for U.S. Appl. No. 15/476,495 (14 pages).
Advisory Action dated Nov. 4, 2019 for U.S. Appl. No. 15/476,495 (5 pages).

* cited by examiner

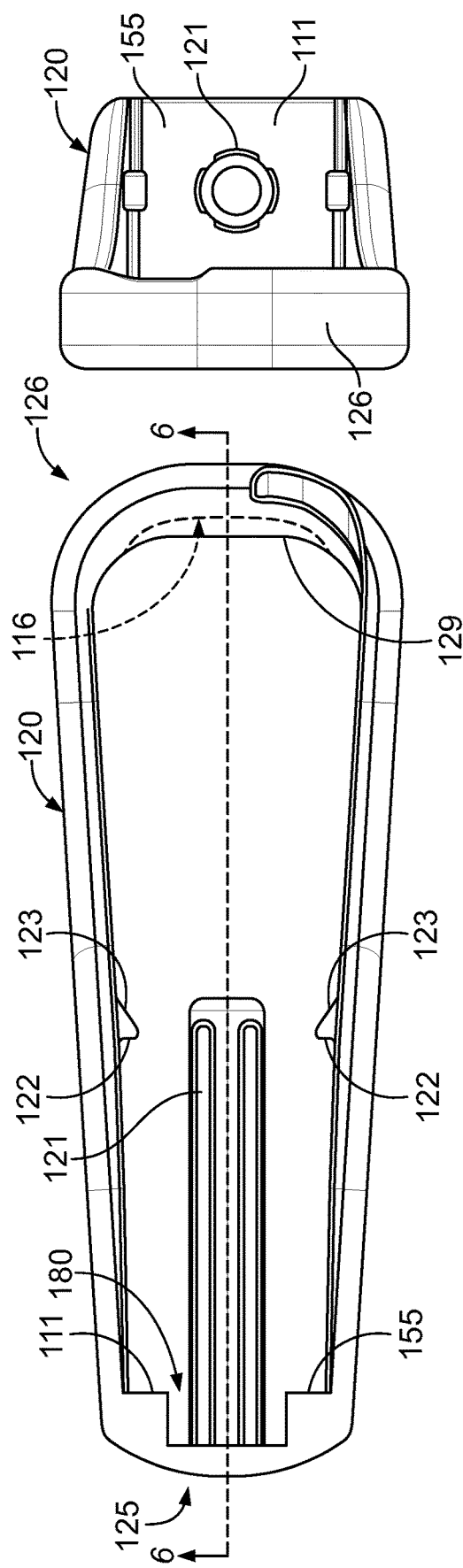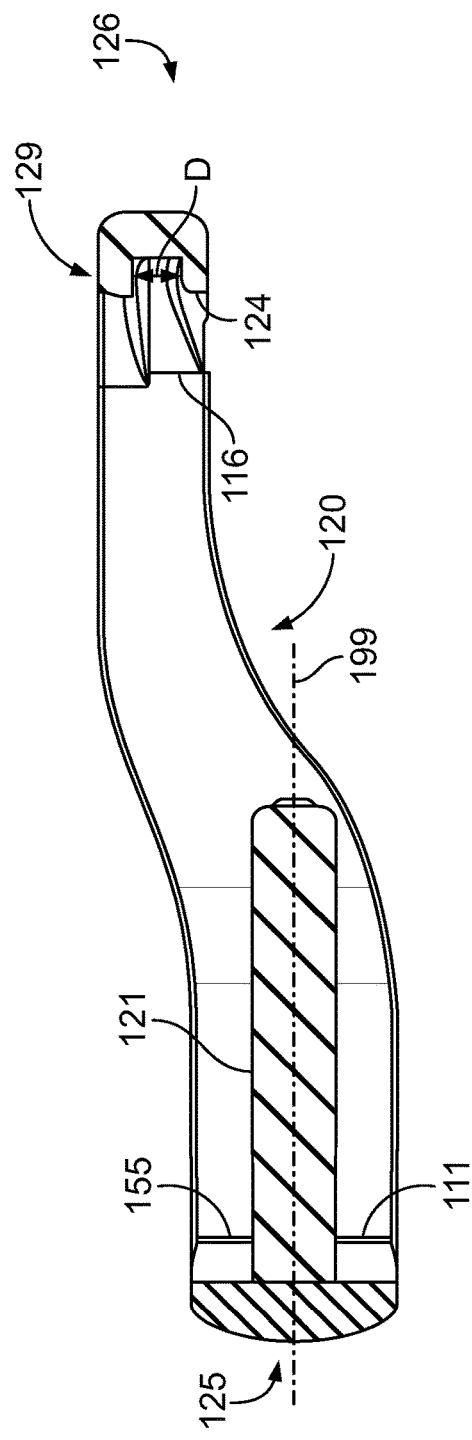

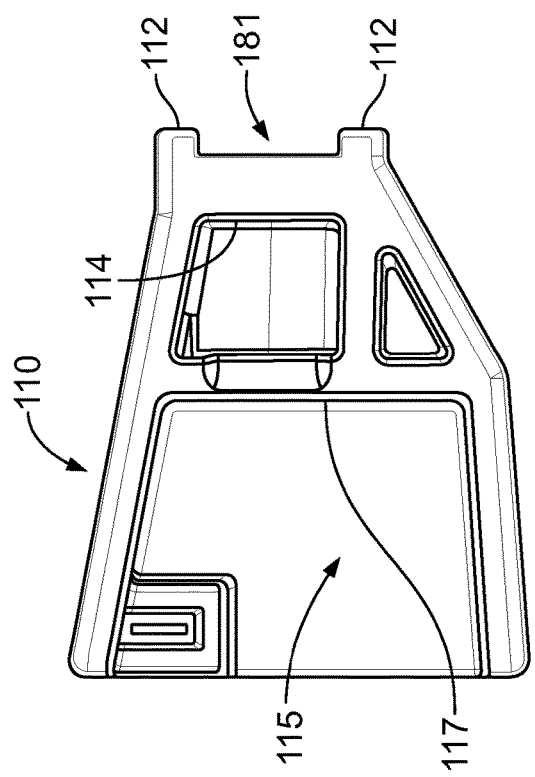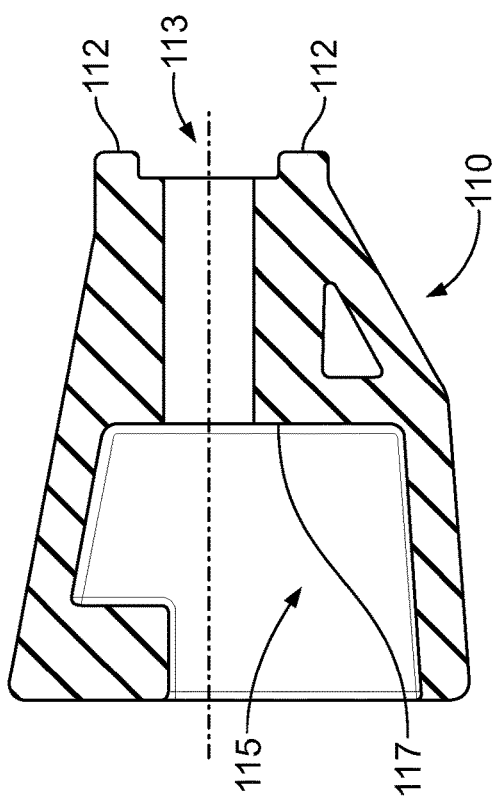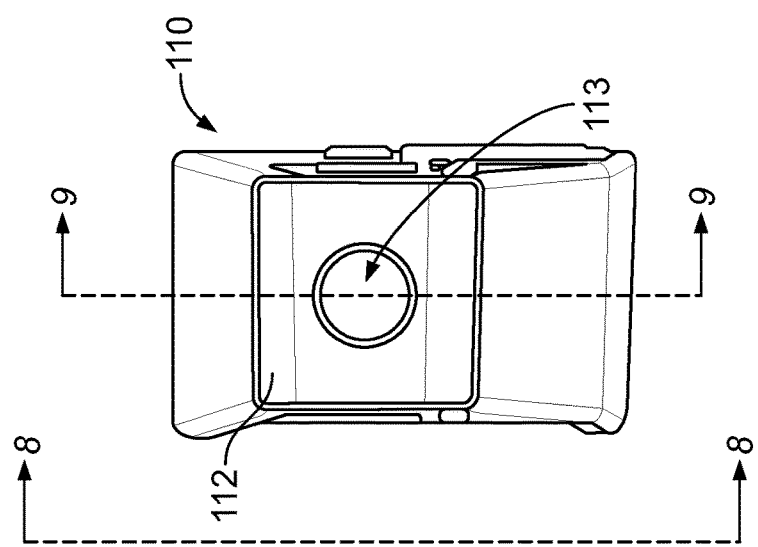

TOOLS FOR RELEASING CABLE TIES

TECHNICAL FIELD

The present disclosure relates to apparatuses and methods for removing cable ties.

BACKGROUND

Cable ties may be used to secure at least one cable or wire in place. The cable tie includes a head with a pawl that is configured to engage a strap having teeth.

Removal of the installed cable tie, however, may be problematic. Conventionally, the cable tie may be removed by one or more techniques. For example, a sharp object, such as a razor blade or a knife, may be used to cut through the strap to release the cable tie. However, the sharp object may damage cables or other equipment retained by the cable tie and may present a safety risk for operators. Another conventional approach is to use a tool that cuts or otherwise damages the pawl of the cable tie, causing the pawl or a portion thereof to disengage from the strap. Accordingly, damaging the pawl may produce FOD (foreign-object debris), which is undesirable, for example, in aircraft applications.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a tool for releasing a cable tie that comprises a head. The tool comprises a chassis, a slider, a first jaw, a second jaw, and a compression spring. The chassis comprises a distal end, a proximal end opposite the distal end, and a distal interior wall, facing the proximal end of the chassis. The slider comprises a slider opening and is coupled to the chassis. The first jaw is coupled to the chassis and is configured to engage the head of the cable tie from a second side of the head. The first jaw is located between the distal interior wall of the chassis and the slider. The second jaw is coupled to the chassis and is configured to engage the head of the cable tie from a first side of the head, opposite the second side. The second jaw is located between the first jaw and the slider. The compression spring is located between the first jaw and the second jaw. When the slider is moved relative to the chassis, the first jaw is stationary relative to the chassis, and the second jaw moves relative to the chassis and is stationary relative to the slider.

Use of a tool as set forth above and elsewhere herein provides for convenient, reliable removal of cable ties. For example, FOD resulting from cable tie removal may be reduced or eliminated. Use of the chassis and slider provide for repeatable, reliable articulation of the first jaw and second jaw to remove cable ties. Use of the compression spring provides an initial position (e.g., when the compression spring is not acted against) that maintains the first jaw and the second jaw in a position that allows placement of the first jaw and the second jaw around a cable tie to be removed.

Another example of the subject matter according to the invention relates to a system for releasing a cable tie that comprises a head. The system comprises a tool and an actuator assembly. The tool comprises a chassis, a slider, a first jaw, a second jaw, and a compression spring. The chassis comprises a distal end, a proximal end opposite the distal end, and a distal interior wall facing the proximal end of the chassis. The slider comprises a slider opening and is coupled to the chassis. The first jaw is coupled to the chassis and is configured to engage the head of the cable tie from a second side of the head. The first jaw is located between the distal interior wall of the chassis and the slider. The second jaw is coupled to the chassis and is configured to engage the head of the cable tie from a first side of the head that is opposite the second side. The second jaw is located between the first jaw and the slider. The compression spring is located between the first jaw and the second jaw. The actuator assembly comprises a primary handle, an actuating handle, an actuator, and a thrust portion. The actuating handle is movable relative to the primary handle. The actuator is coupled to the actuating handle and to the chassis of the tool. The thrust portion abuts the slider. The actuator is movable relative to the thrust portion. When the actuating handle is moved relative to the primary handle, the actuator moves relative to the thrust portion, the slider and the chassis move relative to each other, the first jaw is stationary relative to the chassis, and the second jaw moves relative to the chassis and is stationary relative to the slider.

Use of a system including a tool as set forth above and elsewhere herein provides for convenient, reliable removal of cable ties. For example, FOD resulting from cable tie removal may be reduced or eliminated. Use of the chassis and slider provide for repeatable, reliable articulation of the first jaw and second jaw to remove cable ties. Use of the compression spring provides an initial position (e.g., when the compression spring is not acted against) that maintains the first jaw and the second jaw in a position that allows placement of the first jaw and the second jaw around a cable tie to be removed. Use of an actuator assembly as set forth above and elsewhere herein provides for convenient operation of the tool to remove cable ties. For example, in some examples, an actuator assembly may be disposed on or form part of an existing tool for placing a cable tie in place, providing for convenient re-use of the existing tool (as modified by the presently disclosed tool) for removing the cable tie as well. As another example, in some examples, an actuator assembly may be remotely located from the tool, allowing for convenient positioning of the tool (e.g., within a small and/or difficult to access space).

Yet another example of the subject matter according to the invention relates to a method of using a tool to release a cable tie, fastened around an object. The tool comprises a chassis, a slider supported by the chassis, a first jaw supported by the chassis and configured to engage a head of the cable tie from a second side of the head, and a second jaw, coupled to the chassis between the first jaw and the slider and configured to engage the head of the cable tie from a first side of the head, opposite the second side. The method comprises positioning the tool with the first jaw proximate the second side of the head of the cable tie and with the second jaw proximate the first side of the head of the cable tie. The method also comprises contacting the second side of the cable tie with a first positioning tooth of the first jaw. Further, the method comprises, with the first positioning tooth of the first jaw contacting the second side of the head, moving the slider toward a distal end of the chassis to advance a second-opening-tooth distal end of a second opening tooth of the second jaw inside an opening in the head of the cable tie until the second-opening-tooth distal end is in contact with a base portion of a pawl of the cable tie. Also, the method comprises further moving the slider toward the distal end of the chassis to urge the second-opening-tooth distal end of the second opening tooth of the second jaw toward the first positioning tooth of the first jaw to bias the pawl of the cable tie out of contact with teeth of the cable tie. Further, the method comprises removing the cable tie from the object.

Use of a method as set forth above and elsewhere herein provides for convenient, reliable removal of cable ties. For example, FOD resulting from cable tie removal may be reduced or eliminated. Use of the chassis and slider provide for repeatable, reliable articulation of the first jaw and second jaw to remove cable ties.

BRIEF DESCRIPTION OF THE DRAWINGS

Figure 1:
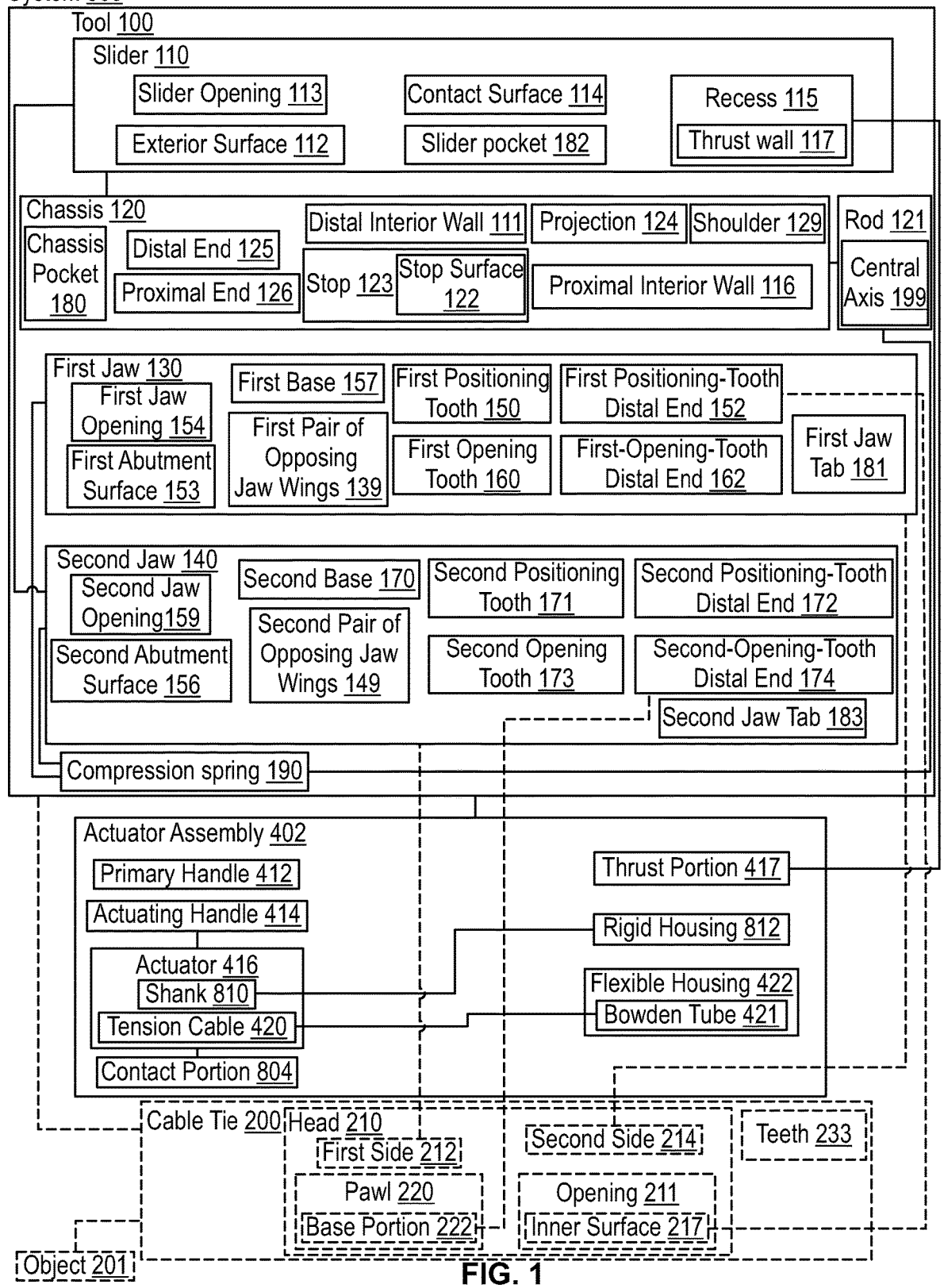
Figure 2:
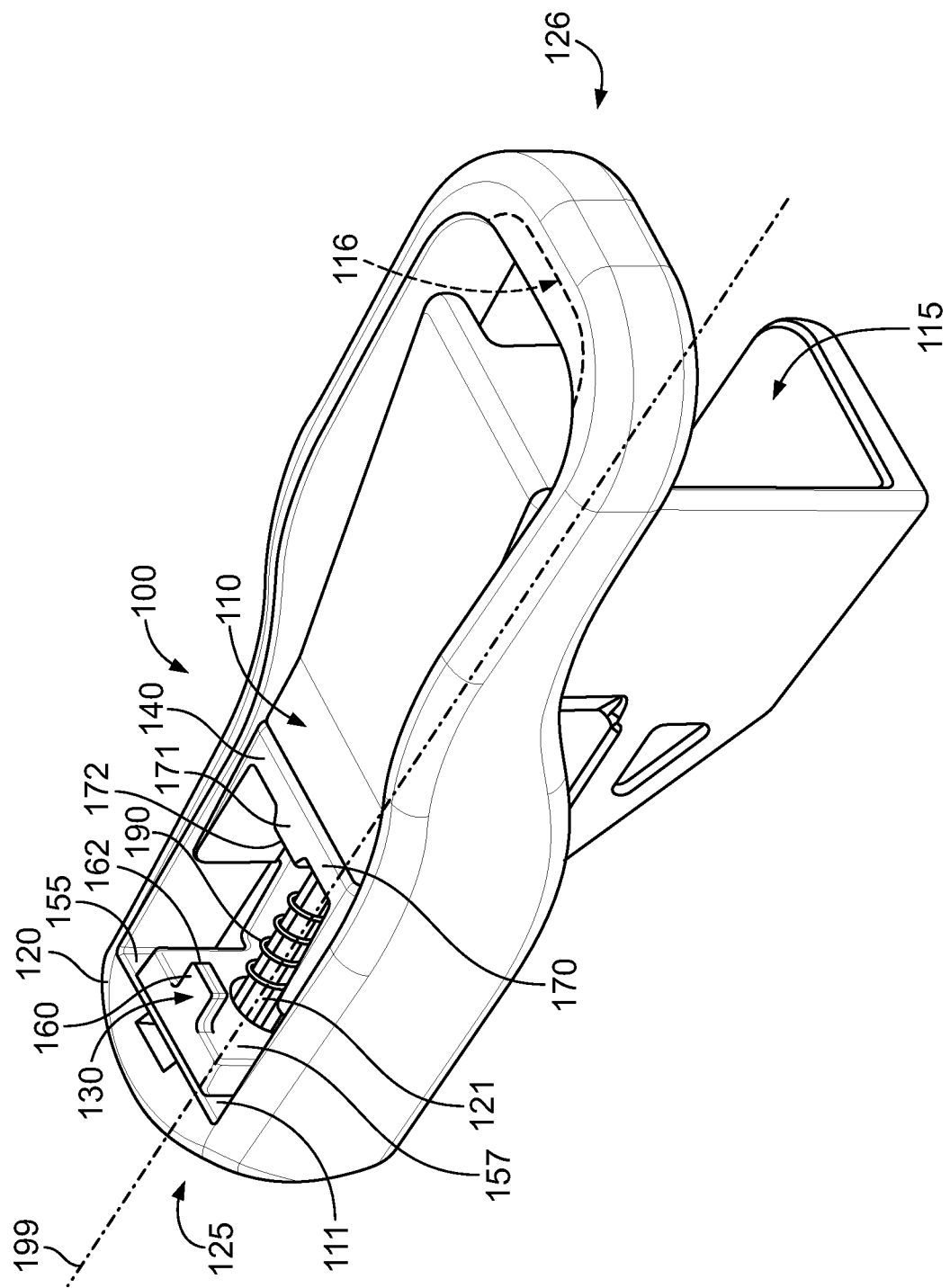
Figure 3:
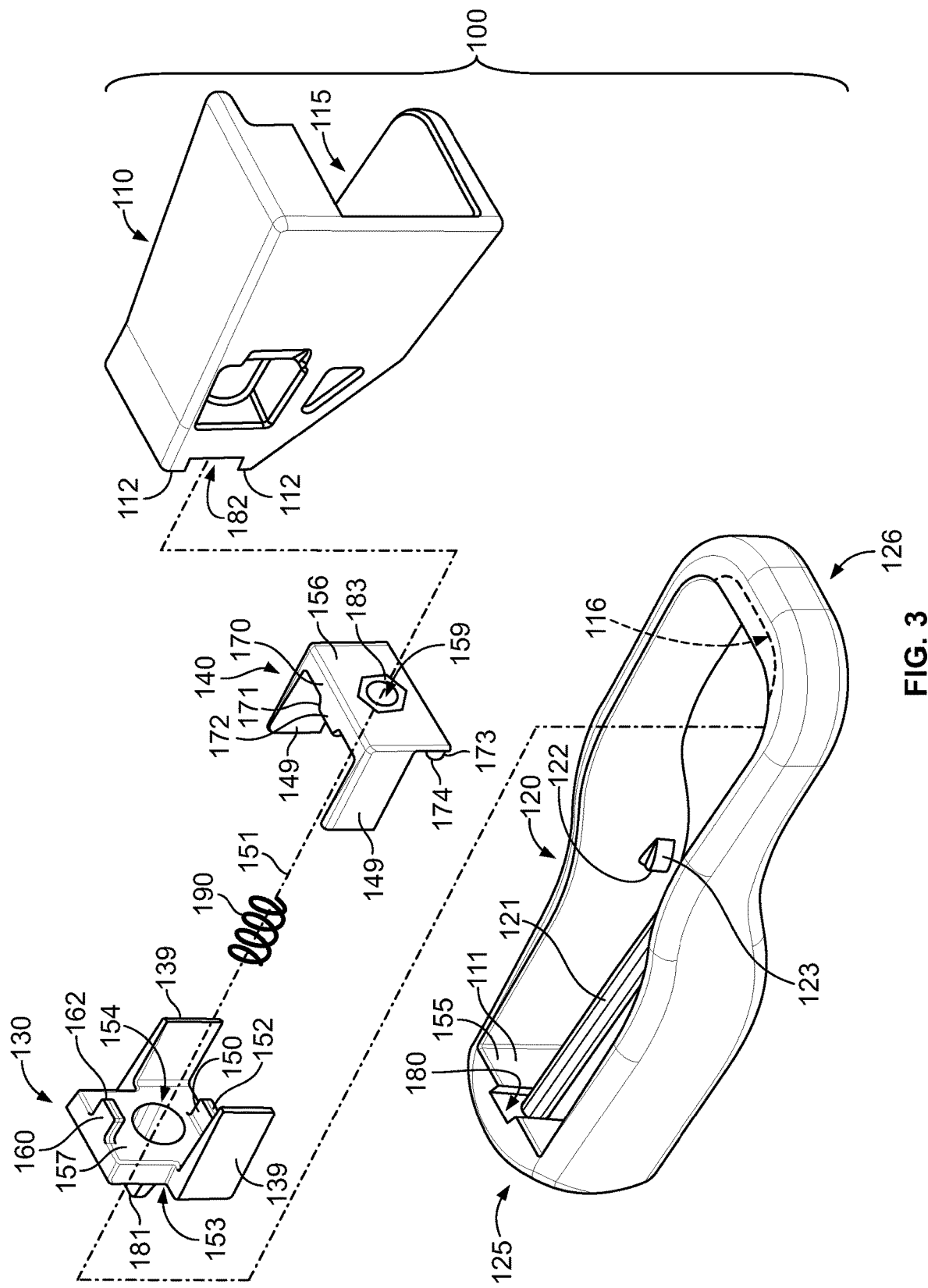
Figure 10:
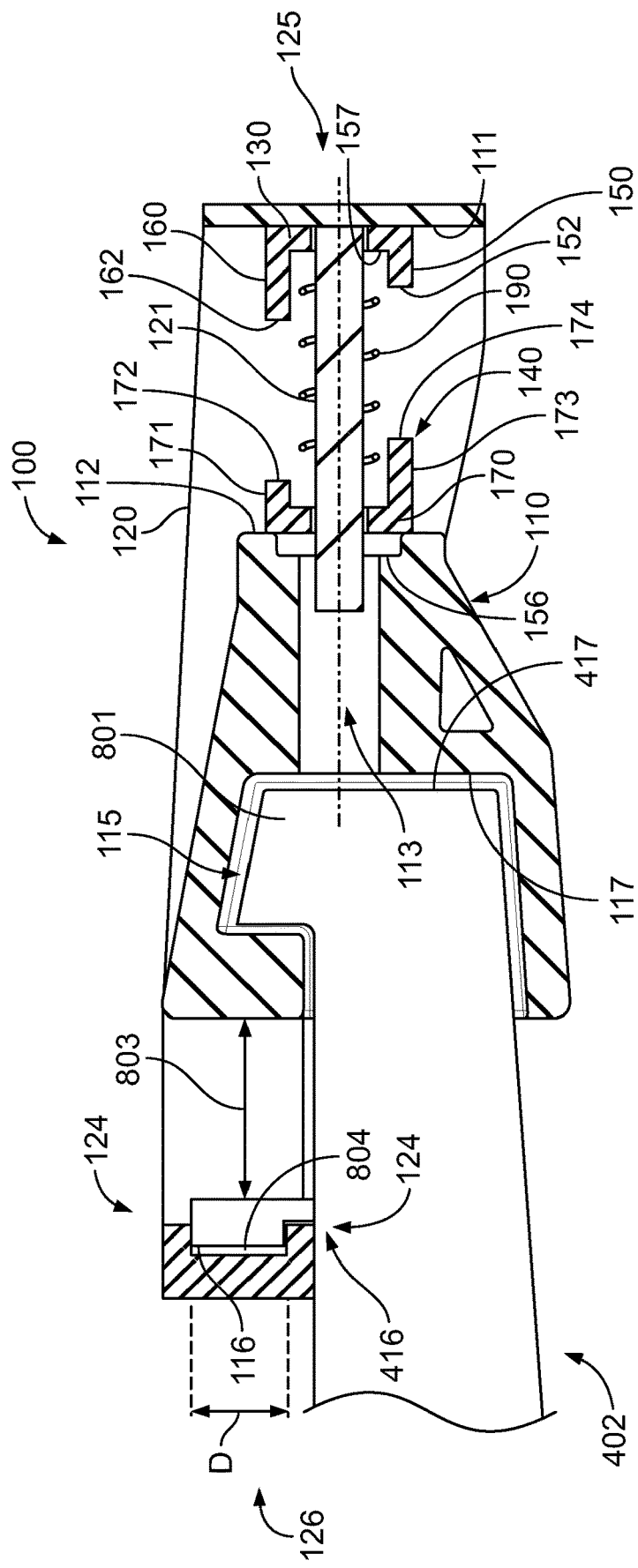
Figure 11:
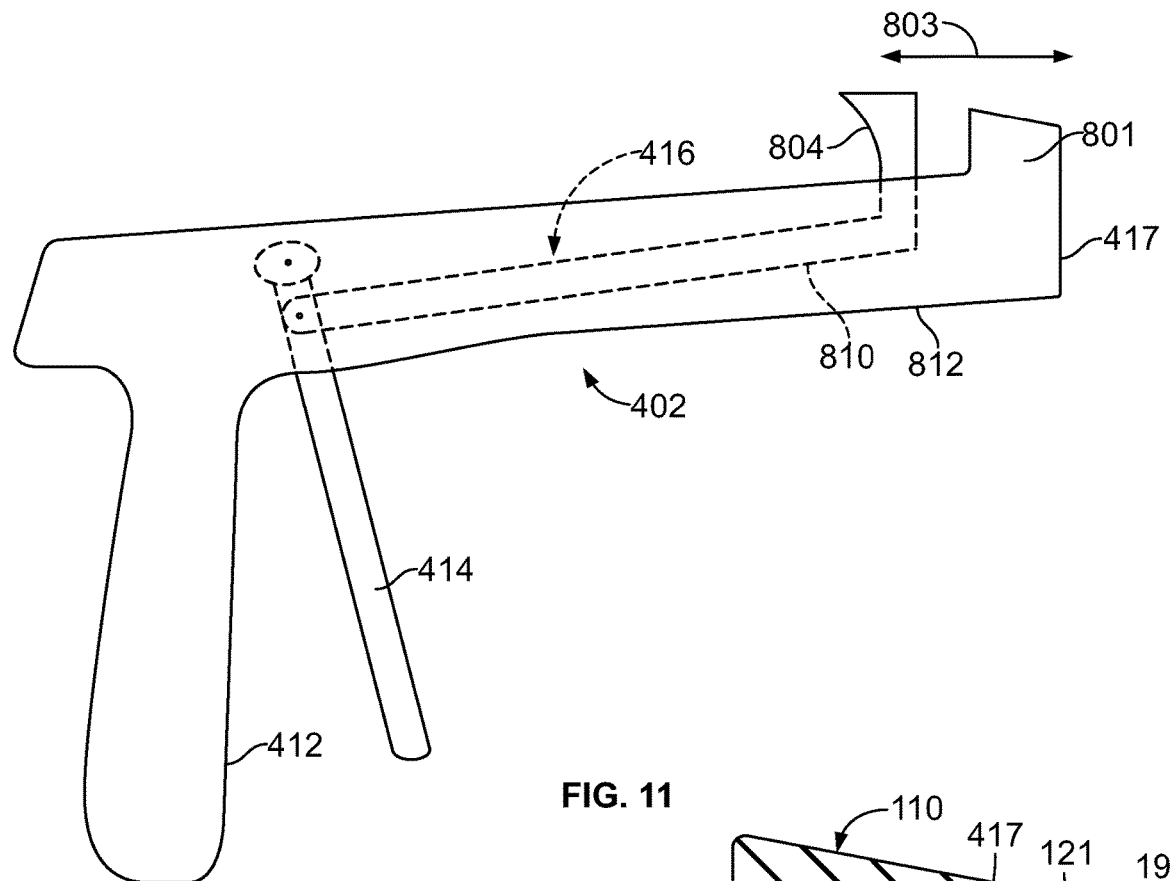
Figure 12:
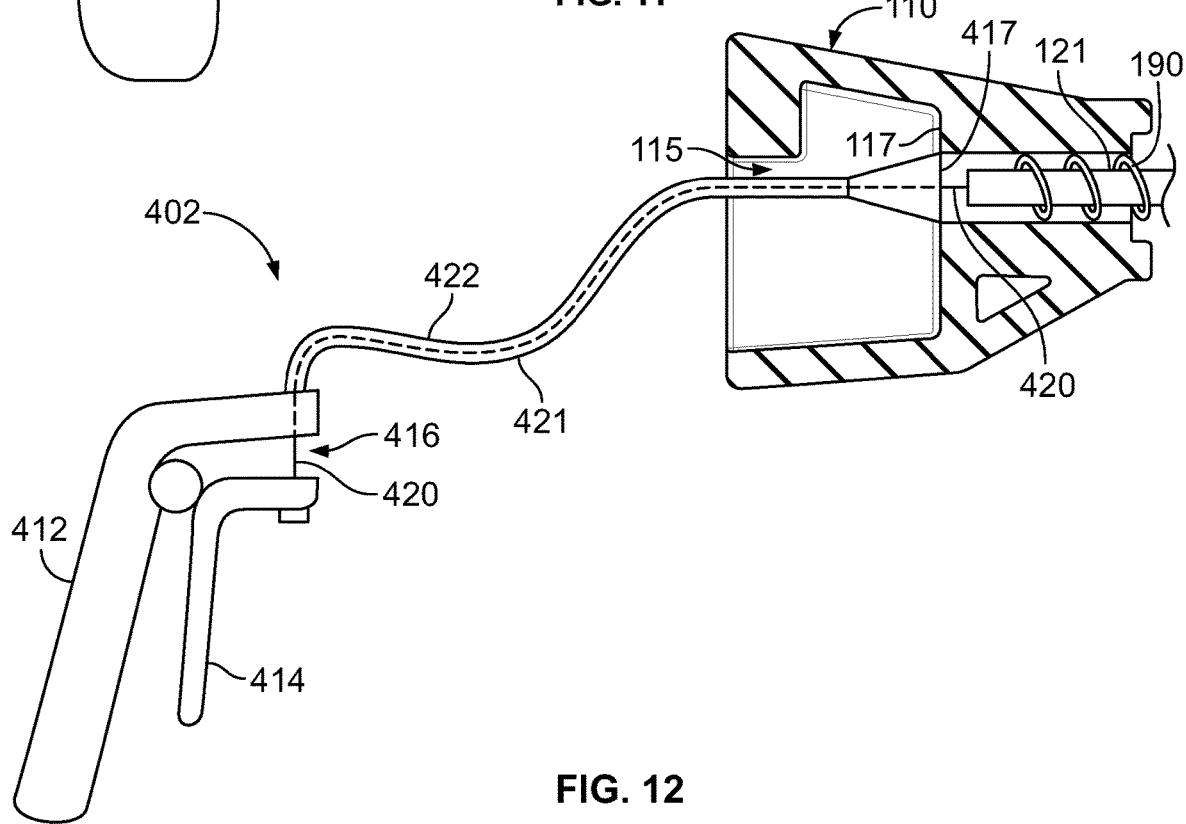
Figure 13:
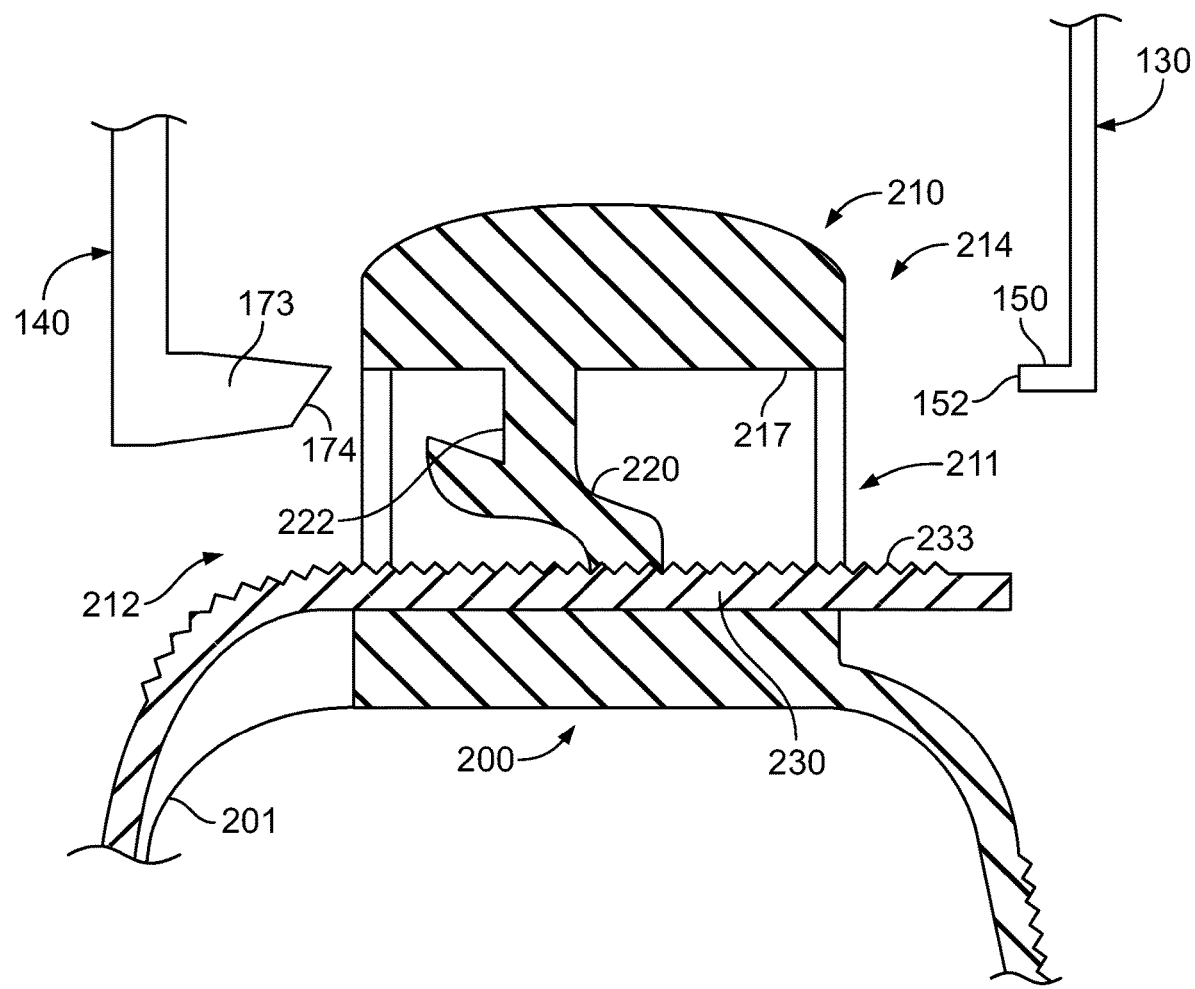
Figure 14A:
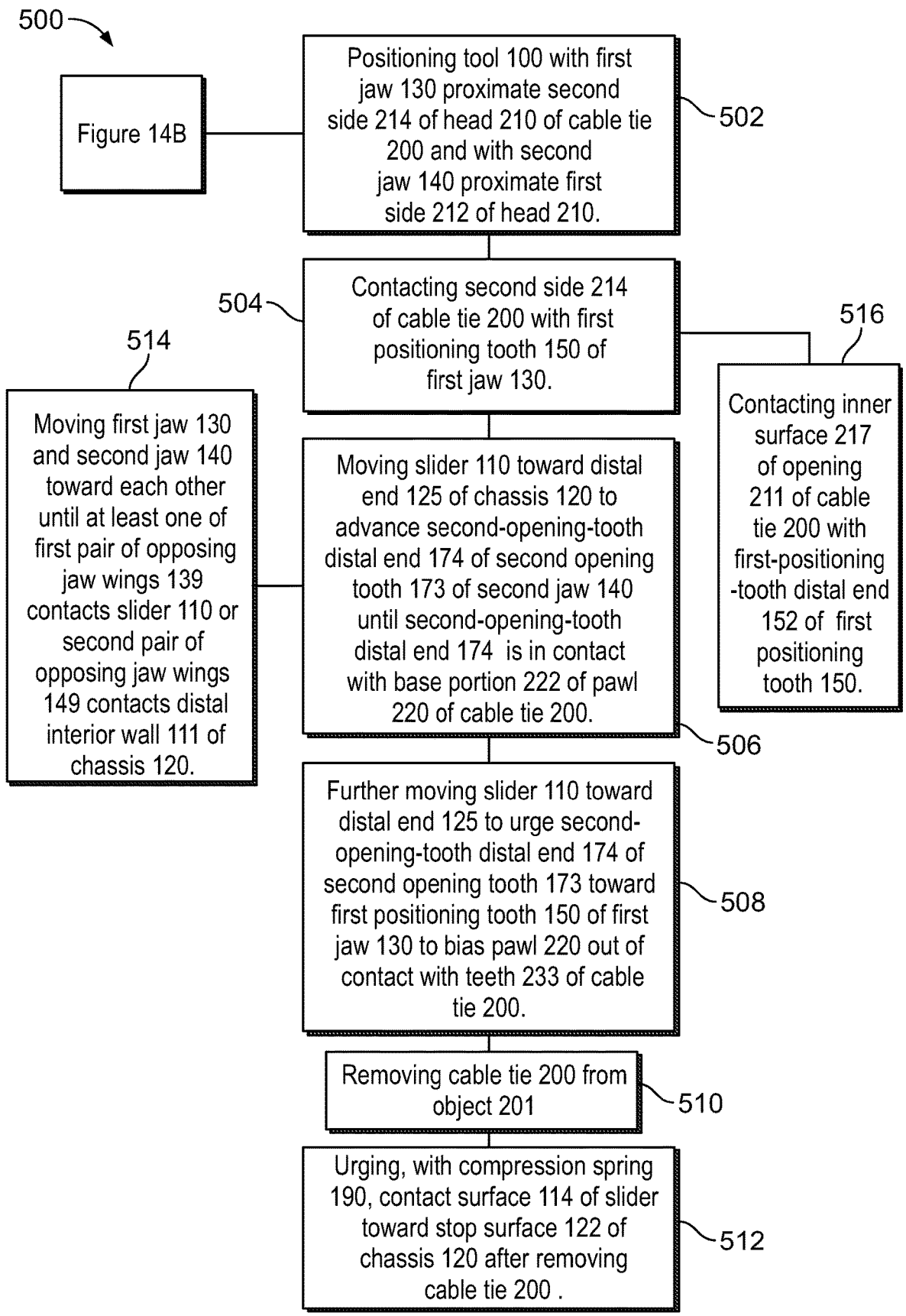
Figure 14B:
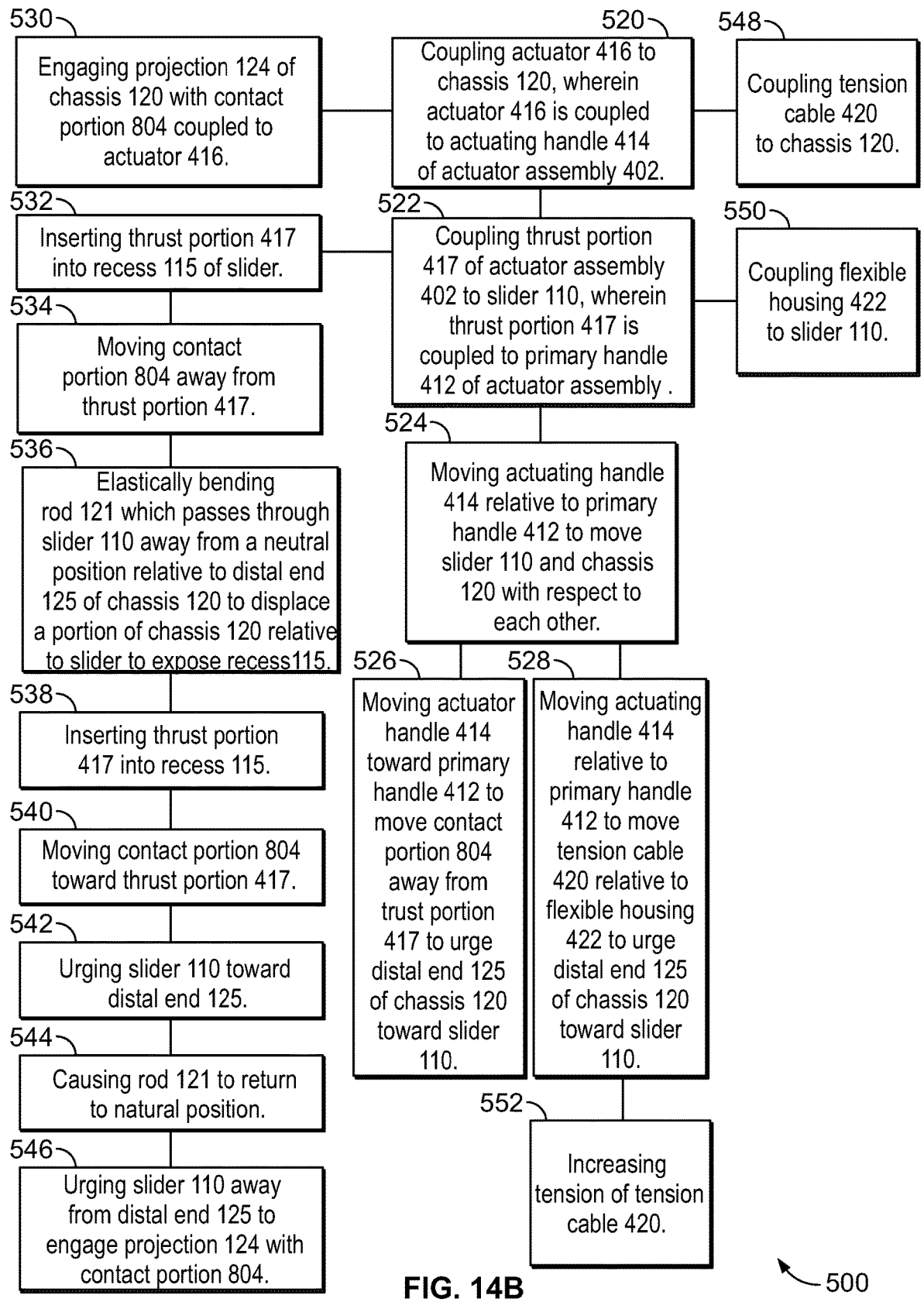
Figure 15:
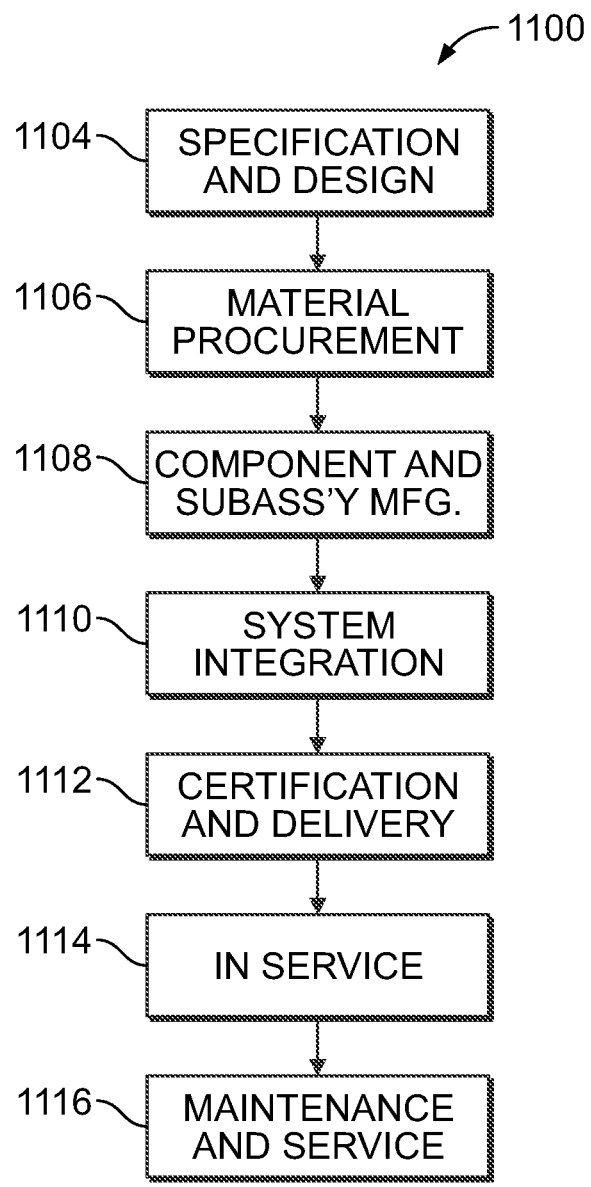

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a system including a tool for releasing a cable tie, according to one or more examples of the present disclosure;

FIG. 2 is a schematic, perspective view of the tool of FIG. 1, according to one or more examples of the present disclosure;

FIG. 3 is a schematic, exploded view of the tool of FIGS. 1 and 2, according to one or more examples of the present disclosure;

FIG. 4 is a schematic, plan view of a chassis of the tool of FIG. 1, according to one or more examples of the present disclosure;

FIG. 5 is a schematic, end view of the chassis of FIG. 4, according to one or more examples of the present disclosure;

FIG. 6 is a schematic, side sectional view of the chassis of FIG. 4, according to one or more examples of the present disclosure;

FIG. 7 is a schematic, end view of a slider of the tool of FIG. 1, according to one or more examples of the present disclosure;

FIG. 8 is a schematic, side view of the slider of FIG. 7, according to one or more examples of the present disclosure;

FIG. 9 is a schematic, side sectional view of the slider of FIG. 8, according to one or more examples of the present disclosure;

FIG. 10 is a schematic, side view of a tool and actuator assembly of FIG. 1, according to one or more examples of the present disclosure;

FIG. 11 is a schematic, side view of and one example of an actuator assembly, according to one or more examples of the present disclosure;

FIG. 12 is a schematic, side view of a coupling of a tool of FIG. 1 and another example of an actuator assembly, according to one or more examples of the present disclosure;

FIG. 13 is a schematic, sectional side view of a cable tie and tool of FIG. 1, according to one or more examples of the present disclosure;

FIGS. 14A and 14B collectively are a block diagram of a method of utilizing the system and/or tool of FIG. 1, according to one or more examples of the present disclosure;

FIG. 15 is a block diagram of aircraft production and service methodology; and

Figure 16:
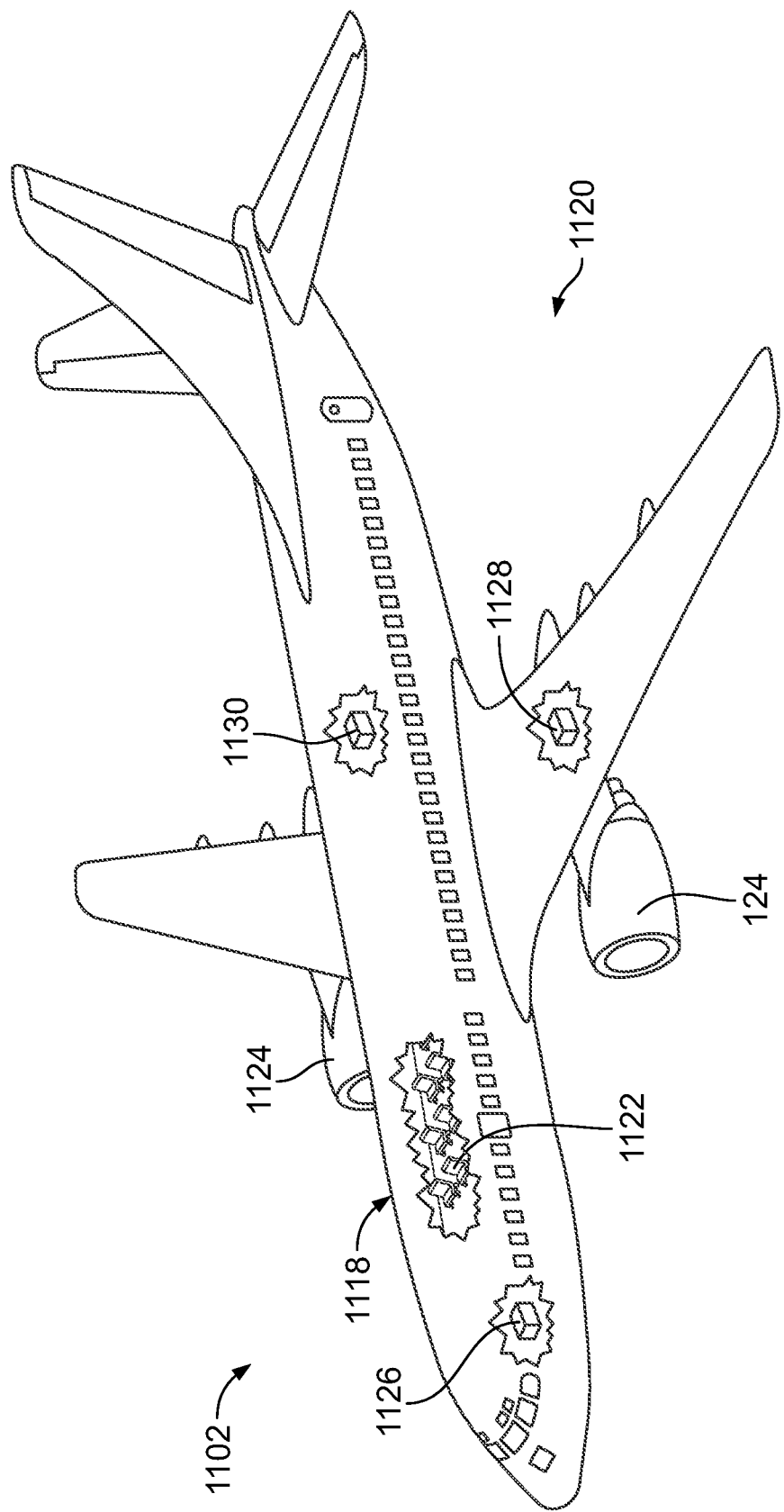

FIG. 16 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 14 and 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 14 and 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-9 and 13, tool 100 for releasing cable tie 200 that comprises head 210 is disclosed. Tool 100 comprises chassis 120, slider 110, first jaw 130, second jaw 140, and compression spring 190. Chassis 120 comprises distal end 125, proximal end 126, opposite distal end 125, and distal interior wall 111, facing proximal end 126 of chassis 120. Slider 110 comprises slider opening 113 and is coupled to chassis 120. First jaw 130 is coupled to chassis 120 and is configured to engage head 210 of cable tie 200 from second side 214 of head 210. First jaw 130 is located between distal interior wall 111 of chassis 120 and slider 110. Second jaw 140 is coupled to chassis 120 and is configured to engage head 210 of cable tie 200 from first side 212 of head 210, opposite second side 214. Second jaw 140 is located between first jaw 130 and slider 110. Compression spring 190 is located between first jaw 130 and second jaw 140. When slider and chassis 120 are moved relative to each other, first jaw 130 is stationary relative to chassis 120, and second jaw 140 moves relative to chassis 120 and is stationary relative to slider 110. The preceding subject matter of this paragraph characterizes example 1 of the present disclosure.

Use of tool 100 provides for convenient, reliable removal of cable ties (e.g., cable tie 200). For example, FOD resulting from cable tie removal may be reduced or eliminated. Use of chassis 120 and slider 110 provide for repeatable, reliable articulation of first jaw 130 and second jaw 140 to remove cable ties. Use of compression spring 190 provides an initial position (e.g., when compression spring 190 is not acted against) that maintains first jaw 130 and second jaw 140 in a position that allows placement of first jaw 130 and second jaw 140 around cable tie 200 to be removed.

Referring generally to FIGS. 1-3 and 13, one example of the present disclosure relates to tool 100 for releasing cable tie 200. In various examples, tool 100 and/or aspects of tool 100 (e.g., first jaw 130, second jaw 140) may be configured and sized for a particular size (and/or range of sizes) and/or style of cable tie 200. It may be noted the depicted examples are provided by way of illustration, and that other sizes and/or styles of cable tie 200 may be removed in various examples, with appropriate configuration of tool 100. As best seen in FIG. 13, an example of cable tie 200 includes head 210, pawl 220, and strap 230. Head 210 includes opening 211, with pawl 220 movably coupled to head 210 inside opening 211. Strap 230 includes teeth 233 extending from strap 230. Head 210 of cable tie 200 includes first side 212 and second side 214. Strap 230 is configured to be inserted through opening 211 from first side 212 to second side 214 to engage pawl 220 with teeth 233. Pawl 220 is coupled to an inner surface of opening 211, and engages teeth 233 to secure cable tie 200 in place. Tool 100 is used to remove cable tie 200 by biasing pawl 220 out of extension with teeth 233, allowing strap 230 to be removed from head 210 and cable tie 200 to be removed from one or more objects secured with cable tie 200.

In the illustrated example, second jaw 140 of tool 100 is urged into contact with pawl 220 (e.g., by a force acting against compression spring 190). As second jaw 140 is further urged against pawl 220, pawl 220 biases out of engagement with teeth 233. First jaw 130 helps position and secure cable tie 200 while second jaw 140 is urged against and biases pawl 220. Once strap 230 is removed from opening 211 and cable tie 200 is removed from one or more objects, an external force may be removed, allowing compression spring 190 to bias first jaw 130 and second jaw 140 apart from each other a sufficient distance to remove head 210 of cable tie 200 from tool 100. It may be noted that other arrangements may be utilized. For example, second jaw 140 may be employed for positioning cable tie 200 within tool 100, and first jaw 130 used to bias pawl 220 out of engagement with teeth 233.

The particular dimensions of tool 100, including the configuration and placement of first jaw 130 and second jaw 140, may be selected or determined such that aspects of first jaw 130 and second jaw 140 not protrude far enough into opening 211 to shear or otherwise separate pawl 220 from head 210, and/or so that pawl 220 is not damaged. For example, aspects of first jaw 130 and/or second jaw 140 may be selected or designed such that pawl 220 is only biased or deflected an amount that does not shear, permanently deform, mangle, or otherwise permanently damage pawl 220 or other aspect of cable tie 200.

For example, cable tie 200 may be made of a resilient material, such that, after pawl 220 is actuated by one of first jaw 130 or second jaw 140 from an original position corresponding to engagement of pawl 220 with teeth 233 of strap 230, pawl 220 may resiliently spring back to the original position (or near to the original position if strap 230 is removed while one of first jaw 130 or second jaw 140 biases pawl 220 out of an engagement position) when first jaw 130 and/or second jaw 140 is withdrawn from opening 211 of head 210 of cable tie 200.

Aspects of tool 100 may be sized and configured so that, when tool 100 is in a closed state (e.g., with first jaw 130 and second jaw 140 brought toward each other sufficiently to bias pawl 220 out of engagement with teeth 233, pawl 220 is not actuated past a threshold or limit beyond which pawl 220 is damaged or otherwise not able to return to the original position. Thus, pawl 220 may be understood as non-destructively biased by tool 100. Thus, cable tie 200 may be re-used after being released from an object (e.g., bundle of cables or wires) using tool 100. Even if cable tie 200 is not re-used, cable tie 200 may be disposed of with pawl 220 still intact (e.g., connected to head 210), with no debris formed or separated from cable tie 200, thereby reducing or eliminating the creation of debris from the release of cable tie 200.

Pawl 220 and cable tie 200 may be made of a resilient material (e.g., a material that may be biased responsive to a force and resiliently return to an original shape or configuration when the force is removed), such as resilient plastic. Tool 100, or portions thereof (e.g., first jaw 130, second jaw 140, compression spring 190) may be made of a metal or other sufficient rigid material, so that, when first jaw 130 and/or second jaw 140 is urged against pawl 220, pawl 220 biases to disengage pawl 220 from strap 230, and first jaw 130 and/or second jaw 140 do not bias or deflect, or bias or deflect a negligible amount that does not interfere with the disengagement of pawl 220 from strap 230. Portions of tool 100 (e.g., slider 110, chassis 120) may be made of a lightweight material, such as plastic, for ease of manufacture and use. Generally, chassis 120 and slider 110 are configured to provide secure, repeatable, reliable movement or translation of slider 110 and chassis 120 with respect to each other, with slider 110 and chassis 120 supporting second jaw 140 and first jaw 130, respectively, to provide reliable articulation of first jaw 130 and second jaw 140 with respect to each other.

Referring generally to FIG. 1 and particularly to, e.g., FIGS. 2 and 3, first jaw 130 is identical to second jaw 140. The preceding subject matter of this paragraph characterizes example 2 of the present disclosure, wherein example 2 also includes the subject matter according to example 1, above.

Use of identical first jaw 130 and second jaw 140 helps save production costs and inventory costs. Use of identical first jaw 130 and second jaw 140 also simplifies assembly, as there is no need to search for or distinguish between first jaw 130 and second jaw 140. It may be noted that, while identical to each other, first jaw 130 and second jaw 140 may be oriented differently, such that complementary portions, instead of identical portions, of first jaw 130 and second jaw 140 face each other during use of tool 100. (See, e.g., examples 3-8 of the present disclosure discussed herein.)

Referring generally to FIG. 1 and particularly to, e.g., FIGS. 2 and 3, first jaw 130 comprises first base 157 and first positioning tooth 150, extending from first base 157 toward second jaw 140. First positioning tooth 150 comprises first-positioning-tooth distal end 152, spaced away from first base 157. Second jaw 140 comprises second base 170 and second positioning tooth 171, extending from second base 170 toward first jaw 130. Second positioning tooth 171 comprises second-positioning-tooth distal end 172, spaced away from second base 170. The preceding subject matter of this paragraph characterizes example 3 of the present disclosure, wherein example 3 also includes the subject matter according to example 1 or 2, above.

Use of positioning teeth (e.g., first positioning tooth 150 and/or second positioning tooth 171) allows for accurate positioning of tool 100 (e.g., first jaw 130 and/or second jaw 140) with respect to cable tie 200 to be removed, and/or provides secure maintenance of head 210 of cable tie 200 in a desired position while one of first jaw 130 or second jaw 140 is used to release cable tie 200 (e.g., used to bias pawl 220 out of engagement with teeth 233 of strap 230).

Referring generally to FIG. 1 and particularly to, e.g., FIGS. 2 and 3, first jaw 130 further comprises first opening tooth 160, extending from first base 157 toward second jaw 140. First opening tooth 160 comprises first-opening-tooth distal end 162, spaced away from first base 157. Second jaw 140 further comprises second opening tooth 173, extending from second base 170 toward first jaw 130. Second opening tooth 173 comprises second-opening-tooth distal end 174, spaced away from second base 170. First opening tooth 160 of first jaw 130 is located opposite second positioning tooth 171 of second jaw 140. Second opening tooth 173 of second jaw 140 is located opposite first positioning tooth 150 of first jaw 130. The preceding subject matter of this paragraph characterizes example 4 of the present disclosure, wherein example 4 also includes the subject matter according to example 3, above.

Use of opening teeth (e.g., first opening tooth 160 and/or second opening tooth 173 allows for reliable release of cable tie 200 (e.g., by cooperating with positioning teeth to allow for accurate positioning of tool 100 or aspects thereof with respect to cable tie 200 to be removed. It may be noted that, when first jaw 130 and second jaw 140 are oriented at 180 degrees to each other (e.g., first positioning tooth 150 faces toward second opening tooth 173, and second positioning tooth 171 faces toward first opening tooth 160), two different arrangements for grasping and releasing cable tie 200 are provided, thereby providing flexibility in positioning and use of tool 100 with respect to cable tie 200 (e.g., tool 100 may be used in two different positions with respect to cable tie 200).

Referring generally to FIG. 1 and particularly to, e.g., FIGS. 2 and 3, first opening tooth 160 of first jaw 130 is different in size from first positioning tooth 150 of first jaw 130 and second opening tooth 173 of second jaw 140 is different in size from second positioning tooth 171 of second jaw 140. The preceding subject matter of this paragraph characterizes example 5 of the present disclosure, wherein example 5 also includes the subject matter according to example 4, above.

Use of differently sized first positioning tooth 150 and second opening tooth 173 helps match tool 100 with particular sizing or other requirements of cable ties in use to allow for accurate positioning of tool 100 or aspects thereof (e.g., first jaw 130 and second jaw 140) with respect to cable tie 200 to be removed. For example, first positioning tooth 150 may be shorter than second opening tooth 173 to allow for more spacing between first positioning tooth 150 and second opening tooth 173 with tool 100 in an open position for insertion of head 210 of cable tie 200 between first positioning tooth 150 and second opening tooth, while still allowing second opening tooth 173 sufficient length to effectively bias pawl 220 out of engagement with teeth 233.

It may be noted that different jaws with different sized opening and/or positioning teeth may be interchangeably used by tool 100 to allow use with a wide range of sizes and/or styles of cable ties.

Referring generally to FIG. 1 and particularly to, e.g., FIGS. 2 and 3, first jaw 130 comprises first pair of opposing jaw wings 139, extending from first base 157, and second jaw 140 comprises second pair of opposing jaw wings 149, extending from second base 170. The preceding subject matter of this paragraph characterizes example 6 of the present disclosure, wherein example 6 also includes the subject matter according to example 4 or 5, above.

Use of first pair of opposing jaw wings 139 and second pair of opposing jaw wings 149 provides lateral support during sliding of first jaw 130 and second jaw 140 (e.g., after contact with pawl 220 to help prevent twisting) and/or provides a positive stop to prevent first jaw 130 and second jaw 140 from getting too close to each other during releasing of cable tie 200, which might remove portions from head 210 (e.g., pawl 220) of cable tie 200 resulting in debris and/or resulting in inability to re-use cable tie 200 after removal.

As seen in the illustrated example, first pair of opposing jaw wings 139 and second pair of opposing jaw wings 149 may extend from only a portion of edges of a corresponding one of first base 157 or second base 170, and be configured to overlap when first jaw 130 and second jaw 140 are urged together.

Referring generally to FIG. 1 and particularly to, e.g., FIGS. 2 and 3, at least one of: first pair of opposing jaw wings 139 of first jaw 130 is configured to contact slider 110 when slider 110 is biased toward distal end 125 of chassis 120 with a force exceeding that of compression spring 190, or second pair of opposing jaw wings 149 of second jaw 140 is configured to contact distal interior wall 111 of chassis 120 when slider 110 is biased toward distal end 125 of chassis 120 with a force exceeding that of compression spring 190. The preceding subject matter of this paragraph characterizes example 7 of the present disclosure, wherein example 7 also includes the subject matter according to example 6, above.

Configuring first pair of opposing jaw wings 139 to contact slider 110 when slider 110 is biased toward distal end 125 of chassis 120 provides a positive stop to prevent first jaw 130 and/or second jaw 140 from penetrating too deeply into opening 211 during removal of cable tie 200 which might remove portions from head 210 (e.g., pawl 220) of cable tie 200 resulting in debris and/or resulting in inability to re-use cable tie 200 after removal. Configuring second pair of opposing jaw wings 149 to contact distal interior wall 111 when slider 110 is biased toward distal end 125 of chassis 120 provides a positive stop to prevent first jaw 130 and/or second jaw 140 from penetrating too deeply into opening 211 during removal of cable tie 200 which might remove portions from head 210 (e.g., pawl 220) of cable tie 200 resulting in debris and/or resulting in inability to re-use cable tie 200 after removal.

The particular size of first pair of opposing jaw wings 139 may be selected so that first jaw 130 and/or second jaw 140 sufficiently penetrates opening 211 to bias pawl 220 out of engagement with teeth 233, but is prevented from penetrating deeply enough to shear or otherwise dislodge pawl 220 (or portion thereof) from head 210 of cable tie 200. Also, the particular size of second pair of opposing jaw wings 149 may be selected so that first jaw 130 and/or second jaw 140 sufficiently penetrates opening 211 to bias pawl 220 out of engagement with teeth 233, but is prevented from penetrating deeply enough to shear or otherwise dislodge pawl 220 (or portion thereof) from head 210 of cable tie 200.

Referring generally to FIG. 1 and particularly to, e.g., FIGS. 2-6, tool 100 also comprises rod 121, extending from distal interior wall 111 of chassis 120 toward proximal end 126 of chassis 120. The preceding subject matter of this paragraph characterizes example 8 of the present disclosure, wherein example 8 also includes the subject matter according to any one of examples 1 to 7, above.

Use of rod 121 provides a support and/or guide structure for various components of tool 100 for reliable and repeatable operation. For example, rod 121 provides reliable positioning and movement of first jaw 130 and second jaw 140 with respect to each other. As another example, rod 121 provides reliable positioning and movement of compression spring 190 with respect to other components of tool 100. As yet another example, rod 121 provides reliable positioning and movement of slider 110 with respect to chassis 120. Further, rod 121 provides for convenient assembly of the components of tool 100 to form tool 100.

In various examples, rod 121 may be formed integrally with chassis 120 (e.g., as part of a molding process. In other examples, rod 121 may be separately formed from chassis 120 and subsequently joined, fixed, or otherwise secured to chassis 120.

Referring generally to FIG. 1 and particularly to, e.g., FIGS. 2-6, first jaw 130 comprises first-jaw opening 154 and second jaw 140 comprises second-jaw opening 159. Rod 121 extends through first-jaw opening 154 of first jaw 130 and second-jaw opening 159 of second jaw 140. The preceding subject matter of this paragraph characterizes example 9 of the present disclosure, wherein example 9 also includes the subject matter according to example 8, above.

Use of rod 121 with first-jaw opening 154 and second-jaw opening 159 provides a support and/or guide structure for first jaw 130 and second jaw 140 for reliable and repeatable operation. Rod 121 provides reliable positioning and movement of first jaw 130 and second jaw 140 with respect to each other. Further, rod 121 provides for convenient assembly of first jaw 130 and second jaw 140 to form tool 100, and/or convenient disassembly and changing of first jaw 130 and second jaw 140 to accommodate different sizes and/or styles of cable tie 200.

Referring generally to FIG. 1 and particularly to, e.g., FIGS. 2-6, compression spring 190 surrounds at least a portion of rod 121. The preceding subject matter of this paragraph characterizes example 10 of the present disclosure, wherein example 10 also includes the subject matter according to example 9, above.

Use of rod 121 provides a support and/or guide structure for compression spring 190 for reliable and repeatable operation. For example, rod 121 acts to prevent or inhibit movement of compression spring 190 in any direction other than along rod 121, providing consistent and predictable forces from compression spring 190 during movement of components that affect the length of compression spring 190. Rod 121 provides reliable positioning and movement of compression spring 190 with respect to other components of tool 100, such as slider 110, chassis 120, first jaw 130, and/or second jaw 140. Further, rod 121 provides for convenient assembly of compression spring 190 with other components of tool 100 to form tool 100.

Referring generally to FIG. 1 and particularly to, e.g., FIGS. 2-9, rod 121, coupled to chassis 120, is inside slider opening 113, and slider 110 is slidable along rod 121. The preceding subject matter of this paragraph characterizes example 11 of the present disclosure, wherein example 11 also includes the subject matter according to example 9 or 10, above.

Use of rod 121 in connection with slider opening 113 provides a support and/or guide structure for slider 110 for reliable and repeatable operation. Rod 121 provides reliable positioning and movement of slider 110 with respect to other components of tool 100, such as compression spring 190, chassis 120, first jaw 130, and/or second jaw 140. Further, rod 121 provides for convenient assembly of slider 110 with other components of tool 100 to form tool 100.

Referring generally to FIG. 1 and particularly to, e.g., FIGS. 2-9, chassis 120 additionally comprises stop 123. Stop 123 comprises stop surface 122, perpendicular to rod 121. Also, slider 110 comprises contact surface 114 that is parallel to stop surface 122. Compression spring 190 biases slider 110 toward stop 123 such that contact surface 114 of slider 110 abuts stop surface 122. The preceding subject matter of this paragraph characterizes example 12 of the present disclosure, wherein example 12 also includes the subject matter according to example 11, above.

Use of stop 123 and contact surface 114 provides a mechanical limit to a gap or distance at which first jaw 130 is separated from second jaw 140 when no external force counteracts compression spring 190. Further, maintaining of a desired amount of compression on compression spring 190 provides a force urging first jaw 130 against chassis 120 and second jaw 140 against slider 110, to help maintain first jaw 130 and second jaw 140 in desired positions and/or orientations.

Stop 123 may be formed integrally with chassis 120 (e.g., as part of a molding process forming chassis 120). Contact surface 114 may be formed integrally with slider 110 (e.g., as part of a molding process forming slider 110). The particular location of stop 123 and contact surface 114 (or aspects thereof) may be selected to provide a desired gap or distance between slider 110 and distal end 125 of chassis 120, and/or a desired gap between first jaw 130 and second jaw 140, when no external force is applied opposing compression spring 190. The desired gap or distance, for example, may provide a predetermined clearance for placement of tool 100 with first jaw 130 and second jaw 140 on opposing sides of head 210 of cable tie 200.

Referring generally to FIG. 1 and particularly to, e.g., FIGS. 2-6, rod 121 is resiliently bendable relative to distal interior wall 111 of chassis 120. The preceding subject matter of this paragraph characterizes example 13 of the present disclosure, wherein example 13 also includes the subject matter according to example 11 or 12, above.

Use of rod 121 that is resiliently bendable allows for removal and addition of slider 110 and/or other components such as first jaw 130 or second jaw 140 during assembly of tool 100, or replacement of different components to accommodate different sizes and/or styles of cable tie 200. Use of resiliently bendable rod 121 in some examples also allows for installation and removal of tool 100 from an actuator.

For example, rod 121 may be biased away from a default position for installation of slider 110 and/or other components (and/or for installation or removal of tool 100 from an actuator), and then allowed to resiliently return to a default position (e.g., extending perpendicularly from chassis 120) for operation of tool 100 to remove cable tie 200. As used herein, rod 121 that is resiliently bendable may be understood as a structure that can be biased sufficiently to allow assembly or removal of slider 110 or other components of tool 100 (and/or installation or removal of tool 100 from an actuator), and will return within a functional tolerance to an original or default position for reliable use of tool 100. Rod 121 may be formed integrally with chassis 120. For example, chassis 120 and rod 121 may be molded as a single piece of a plastic that is sufficiently resilient at a predetermined diameter and length of rod 121 to provide a desired range of bending for assembly, while also providing for reliable return to an original or default position.

Referring generally to FIG. 1 and particularly to, e.g., FIGS. 2-9, slider 110 comprises recess 115, and chassis 120 comprises proximal interior wall 116 that is located opposite distal interior wall 111. Chassis 120 further comprises projection 124 that extends from proximal interior wall 116 toward distal interior wall 111. The preceding subject matter of this paragraph characterizes example 14 of the present disclosure, wherein example 14 also includes the subject matter according to any one of examples 8 to 13, above.

Use of recess 115 and projection 124 allows for convenient, accurate mounting of tool 100 to an actuator (see, e.g., FIGS. 10-11 and related discussion), and use of actuator to bias first jaw 130 and second jaw 140 with respect to each other to remove cable tie 200.

The particular configurations of recess 115 and projection 124 (e.g., size, position) may be selected to match an existing actuator, such as a standardly available cable-tie gun.

Referring generally to FIG. 1 and particularly to, e.g., FIGS. 2-9, recess 115 of slider 110 comprises thrust wall 117. Thrust wall 117 is perpendicular to rod 121, coupled to chassis 120, and faces proximal interior wall 116 of chassis 120. The preceding subject matter of this paragraph characterizes example 15 of the present disclosure, wherein example 15 also includes the subject matter according to example 14, above.

Use of thrust wall 117 allows for convenient and accurate mounting of tool 100 on an actuator, and reliable use of tool 100 to remove cable tie 200. For example, thrust wall 117 may be configured to prevent movement of one part of an actuator to which tool 100 is mounted relative to slider 110, while allowing a different portion of the actuator to move chassis 120 relative to slider 110.

The particular configuration of thrust wall 117 (e.g., size, position) may be selected to match an existing actuator, such as portions of a standardly available cable-tie gun (e.g., to secure slider 110 relative to a stationary portion of a cable-tie gun, while allowing chassis 120 to move with a translating portion of the cable-tie gun).

Referring generally to FIG. 1 and particularly to, e.g., FIGS. 2-6, chassis 120 also comprises shoulder 129 that extends from proximal interior wall 116 toward distal interior wall 111 and is spaced distance (d) from projection 124. The preceding subject matter of this paragraph characterizes example 16 of the present disclosure, wherein example 16 also includes the subject matter according to example 14 or 15, above.

Use of shoulder 129 allows for accurate, reliable retention of tool 100 in a desired position (or positions) with respect to an actuator to which tool 100 is attached.

Shoulder 129 may be formed integrally with chassis 120 (e.g., as part of a molding process forming chassis 120).

Referring generally to FIG. 1 and particularly to, e.g., FIGS. 2-6, first jaw 130 comprises first abutment surface 153, contacting distal interior wall 111 of chassis 120. The preceding subject matter of this paragraph characterizes example 17 of the present disclosure, wherein example 17 also includes the subject matter according to any one of examples 1 to 16, above.

First abutment surface 153 provides support for positioning first jaw 130 and maintaining first jaw 130 in contact with chassis 120 during movement of tool 100.

Referring generally to FIG. 1 and particularly to, e.g., FIGS. 2-9, slider 110 comprises exterior surface 112 that faces distal interior wall 111 of chassis 120. Second jaw 140 comprises second abutment surface 156 that abuts exterior surface 112 of slider 110. The preceding subject matter of this paragraph characterizes example 18 of the present disclosure, wherein example 18 also includes the subject matter according to any one of examples 1 to 17, above.

Use of second abutment surface 156 in conjunction with exterior surface 112 provides support for positioning second jaw 140 and maintaining second jaw 140 in contact with slider 110 during movement of tool 100.

Referring generally to FIG. 1 and particularly to, e.g., FIGS. 2-6, chassis 120 also comprises proximal interior wall 116 that is located opposite distal interior wall 111. Tool 100 further comprises rod 121, having central axis 199. Rod 121 extends from distal interior wall 111 toward proximal end 126 of chassis 120. Central axis 199 does not pass through proximal interior wall 116 of chassis 120. The preceding subject matter of this paragraph characterizes example 19 of the present disclosure, wherein example 19 also includes the subject matter according to any one of examples 1 to 13, above.

Use of proximal interior wall 116 that is offset from rod 121 (e.g., central axis 199 of rod 121 does not pass through proximal interior wall 116) provides clearance for mounting of tool 100 to a standardly available cable tie-gun. The particular location of proximal interior wall 116 and rod 121 with respect to each other may be selected to accommodate a particular cable-tie gun (or group of cable-tie guns) to which tool 100 is to be mounted.

Referring generally to FIG. 1 and particularly to, e.g., FIGS. 2-3, first jaw 130 is rotationally fixed with respect to chassis 120 and second jaw 140 is rotationally fixed with respect to slider 110. The preceding subject matter of this paragraph characterizes example 20 of the present disclosure, wherein example 20 also includes the subject matter according to any one of examples 1 to 19, above.

Rotationally fixing first jaw 130 with respect to chassis 120 and second jaw 140 with respect to slider 110 provides reliable, accurate positioning of first jaw 130 and second jaw 140 relative to cable tie 200 and reduces or eliminated twisting of first jaw 130 and/or second jaw 140 relative to cable tie 200 during use of tool 100.

It may be noted that two components described as rotationally fixed as used herein may be understood as having features or adaptations configured to eliminate rotation of the two components with respect to each other or to maintain an amount of rotation therebetween within a predetermined tolerance (e.g., +/−5 degrees of rotation). For example, chassis 120 and first jaw 130 may include one or more features, surfaces, edges, projections, and/or recesses configured to cooperate with a corresponding feature, surface, edge, projection, and/or recess to reduce or inhibit rotation between chassis 120 and first jaw 130. Slider 110 and second jaw 140 may include one or more features, surfaces, edges, projections, and/or recesses configured to cooperate with a corresponding feature, surface, edge, projection, and/or recess to reduce or inhibit rotation between slider 110 and second jaw 140.

Referring generally to FIG. 1 and particularly to, e.g., FIGS. 2-6, chassis 120 also comprises chassis pocket 180 that is formed in distal interior wall 111 of chassis 120. First jaw 130 comprises first jaw tab 181 that is received by chassis pocket 180 to rotationally fix first jaw 130 with respect to chassis 120. The preceding subject matter of this paragraph characterizes example 21 of the present disclosure, wherein example 21 also includes the subject matter according to example 20, above.

Use of chassis pocket 180 in conjunction with first jaw tab 181 provides reliable, accurate positioning of first jaw 130 and reduces or eliminates twisting or rotation of first jaw 130 during use of tool 100.

In some examples, first jaw tab 181 may be a portion of a hex head affixed to or formed with first jaw 130, and chassis pocket 180 may include vertical walls that cooperate with opposed sides of the hex head to secure first jaw 130 relative to chassis 120.

Referring generally to FIG. 1 and particularly to, e.g., FIGS. 2-9, slider 110 also comprises exterior surface 112 that faces distal interior wall 111 of chassis 120. Slider 110 further comprises slider pocket 182, recessed relative to exterior surface 112. Second jaw 140 comprises second jaw tab 183 that is received by slider pocket 182 to rotationally fix second jaw 140 with respect to slider 110. The preceding subject matter of this paragraph characterizes example 22 of the present disclosure, wherein example 22 also includes the subject matter according to example 20 or 21, above.

Use of slider pocket 182 in conjunction with second jaw tab 183 provides reliable, accurate positioning of second jaw 140 and reduces or eliminates twisting or rotation of second jaw 140 during use of tool 100.

In some examples, second jaw tab 183 may be a portion of a hex head affixed to or formed with second jaw 140, and slider pocket 182 may include horizontal walls that cooperate with opposed sides of the hex head to secure second jaw 140 relative to slider 110.

Referring generally to FIG. 1 and particularly to, e.g., FIGS. 2-13, system 300 for releasing cable tie 200 that comprises head 210 is disclosed. System 300 comprises tool 100 and actuator assembly 402. Tool 100 comprises chassis 120, slider 110, first jaw 130, second jaw 140, and compression spring 190. Chassis 120 comprises distal end 125, proximal end 126, opposite distal end 125, and distal interior wall 111, facing proximal end 126 of chassis 120. Slider 110 comprises slider opening 113 and is coupled to chassis 120. First jaw 130 is coupled to chassis 120 and is configured to engage head 210 of cable tie 200 from second side 214 of head 210. First jaw 130 is located between distal interior wall 111 of chassis 120 and slider 110. Second jaw 140 is coupled to chassis 120 and is configured to engage head 210 of cable tie 200 from first side 212 of head 210, opposite second side 214. Second jaw 140 is located between first jaw 130 and slider 110. Compression spring 190 is located between first jaw 130 and second jaw 140. Actuator assembly 402 comprises primary handle 412, actuating handle 414, actuator 416, and thrust portion 417. Actuating handle 414 is movable relative to primary handle 412. Actuator 416 is coupled to actuating handle 414 and to chassis 120 of tool 100. Thrust portion 417 abuts slider 110. Actuator 416 is movable relative to thrust portion 417. When actuating handle 414 is moved relative to primary handle 412, actuator 416 moves relative to thrust portion 417, slider 110 and chassis 120 move relative to each other, first jaw 130 is stationary relative to chassis 120 and second jaw 140 moves relative to chassis 120 and is stationary relative to slider 110. The preceding subject matter of this paragraph characterizes example 23 of the present disclosure.

Use of system 300 including tool 100 provides for convenient, reliable removal of cable ties. For example, FOD resulting from cable tie removal may be reduced or eliminated. Use of chassis 120 and slider 110 provide for repeatable, reliable articulation of first jaw 130 and second jaw 140 to remove cable tie 200. Use of compression spring 190 provides an initial position (e.g., when the compression spring is not acted against) that maintains first jaw 130 and second jaw 140 in a position that allows placement of first jaw 130 and second jaw 140 around cable tie 200 to be removed. Use of actuator assembly 402 provides for convenient operation of tool 100 to remove cable tie 200. For example, in some examples, actuator assembly 402 may be disposed on or form part of an existing tool for placing cable tie 200 in place, providing for convenient re-use of the existing tool (as modified by presently disclosed tool 100) for removing cable tie 200 as well. As another example, in some examples, actuator assembly 402 may be remotely located from tool 100, allowing for convenient positioning of tool 100 (e.g., within a small and/or difficult to access space).

Referring generally to FIG. 1 and particularly to, e.g., FIGS. 2-11, thrust portion 417 is spaced a fixed distance away from primary handle 412. The preceding subject matter of this paragraph characterizes example 24 of the present disclosure, wherein example 24 also includes the subject matter according to example 23, above.

Use of thrust portion 417 being spaced a fixed distance away from primary handle 412 provides for convenient manipulation of tool 100 within a predefined space. For example, a standard cable-tie gun having a fixed distance between a trigger and an exterior surface may be employed as an actuator providing a thrust portion being spaced a fixed distance away from a primary handle.

Referring generally to FIG. 1 and particularly to, e.g., FIGS. 2-11, actuator assembly 402 also comprises rigid housing 812, and thrust portion 417 forms a part of rigid housing 812. The preceding subject matter of this paragraph characterizes example 25 of the present disclosure, wherein example 25 also includes the subject matter according to example 24, above.

Use of rigid housing 812, with thrust portion 417 forming a part of rigid housing, provides a rugged, durable actuator assembly 402 providing reliable, consistent performance.

Referring generally to FIG. 1 and particularly to, e.g., FIGS. 2-11, slider 110 comprises recess 115 to accept thrust portion 417. Chassis 120 further comprises proximal interior wall 116 and projection 124. Proximal interior wall 116 is located opposite distal interior wall 111. Projection 124 extends from proximal interior wall 116 toward distal interior wall 111. The preceding subject matter of this paragraph characterizes example 26 of the present disclosure, wherein example 26 also includes the subject matter according to example 25, above.

Use of recess 115 and projection 124 provide for secure, repeatable mounting of tool 100 to actuator assembly 402.

It may be noted that the particular configuration (e.g., size, shape, position) of recess 115, projection 124, and proximal interior wall 116 may be selected to match a particular actuator assembly or range or style of actuator assembly. For example, the configuration (e.g., size, shape, position) of recess 115, projection 124, and proximal interior wall 116 may be selected to cooperate with known dimensions of a predetermined cable tie gun to secure tool 100 to the predetermined cable tie gun.

Referring generally to FIG. 1 and particularly to, e.g., FIGS. 2-11, actuator assembly 402 also comprises contact portion 804. Contact portion 804 is coupled to actuator 416 to engage projection 124 that extends from proximal interior wall 116 of chassis 120. The preceding subject matter of this paragraph characterizes example 27 of the present disclosure, wherein example 27 also includes the subject matter according to example 26, above.

Contact portion 804 provides a location for coupling actuator assembly 402 and tool 100 for movement of chassis 120 with actuator 416. Contact portion 804 may be formed integrally with actuator 416. For example, contact portion 804 may extend from actuator 416.

Referring generally to FIG. 1 and particularly to, e.g., FIGS. 2-11, actuator 416 is shank 810 that is movable within rigid housing 812. The preceding subject matter of this paragraph characterizes example 28 of the present disclosure, wherein example 28 also includes the subject matter according to any one of examples 25 to 27, above.

Disposing shank 810 within rigid housing 812 provides protection to shank 810. Shank 810 may be disposed within a housing of a standard cable tie gun and actuated via movement of a trigger that forms all or part of actuating handle 414.

Referring generally to FIG. 1 and particularly to, e.g., FIGS. 2-11, primary handle 412 forms a part of rigid housing 812. The preceding subject matter of this paragraph characterizes example 29 of the present disclosure, wherein example 29 also includes the subject matter according to any one of examples 25 to 28, above.

Use of primary handle 412 which forms a part of rigid housing 812 provides for an easy-to-use, convenient-to-produce actuator assembly 402, and reduces the number of parts. For example, rigid housing 812 may molded from plastic with primary handle 412 formed as an integral part of rigid housing 812 during molding.

Referring generally to FIG. 1 and particularly to, e.g., FIGS. 2-9 and 12, primary handle 412 is movable relative to thrust portion 417. The preceding subject matter of this paragraph characterizes example 30 of the present disclosure, wherein example 30 also includes the subject matter according to example 23, above.

Use of primary handle 412 that is movable relative to thrust portion 417 allows for the location of primary handle 412 relative to thrust portion 417 (and slider 110 which thrust portion 417 abuts) to be varied. Accordingly, in various examples, primary handle 412 may be located at a remote position from thrust portion 417, allowing tool 100 to be used in confined areas that may not allow sufficient room for placement of primary handle 412 (and/or other portions of actuator assembly 402 such as actuating handle 414) close to a cable tie to be removed.

Referring generally to FIG. 1 and particularly to, e.g., FIGS. 2-9 and 12, actuator assembly 402 also comprises flexible housing 422. Thrust portion 417 is coupled to flexible housing 422. The preceding subject matter of this paragraph characterizes example 31 of the present disclosure, wherein example 31 also includes the subject matter according to example 30, above.

Use of flexible housing 422 allows one or more portions of actuator assembly 402 to be varied in position with respect to thrust portion 417 (and slider 110 which thrust portion abuts), allowing tool 100 to be used in a variety of confined spaces that would not allow for use of a rigid housing coupled to tool 100.

Referring generally to FIG. 1 and particularly to, e.g., FIGS. 2-9 and 12, slider 110 comprises recess 115 to accept thrust portion 417. The preceding subject matter of this paragraph characterizes example 32 of the present disclosure, wherein example 32 also includes the subject matter according to example 31, above.

Use of recess 115 provides reliable coupling of tool 100 and actuator assembly 402. It may be noted that recess 115 may correspond to the shape of thrust portion 417 or not. For example, recess 115 may snugly or securely accept thrust portion 417 with thrust portion 417 secured to recess 115, or recess 115 may accept thrust portion 417 loosely with thrust portion 417 secured otherwise to slider 110.

Referring generally to FIG. 1 and particularly to, e.g., FIGS. 2-9 and 12, actuator 416 is tension cable 420. A portion of tension cable 420 is internal to flexible housing 422. Tension cable 420 is movable relative to flexible housing 422. The preceding subject matter of this paragraph characterizes example 33 of the present disclosure, wherein example 33 also includes the subject matter according to example 32, above.

Disposing tension cable 420 within flexible housing 422 protects tension cable 420 from damage and provides a path for interference-free travel of tension cable 420. In some examples, the tension on tension cable 420 may be increased (e.g., by pulling actuating handle 414 toward primary handle 412) to provide a pulling force on chassis 120 having sufficient force to overcome a force provided by compression spring 190 to move chassis 120 and slider 110 relative to each other, and accordingly to move first jaw 130 and second jaw 140 toward each other. After release of tension on tension cable 420, compression spring 190 urges first jaw 130 and second jaw 140 away from each other.

Referring generally to FIG. 1 and particularly to, e.g., FIGS. 2-9 and 12, flexible housing 422 is Bowden tube 421. Bowden tube 421 connects primary handle 412 and thrust portion 417. Tension cable 420 connects actuating handle 414 to chassis 120. The preceding subject matter of this paragraph characterizes example 34 of the present disclosure, wherein example 34 also includes the subject matter according to example 33, above.

Use of Bowden tube 421 as flexible housing 422 and to connect primary handle 412 and thrust portion 417 provides a readily available, convenient structure for constructing actuator assembly 402. With tension cable 420 connecting actuating handle 414 to chassis 120, primary handle 412 may be utilized to secure Bowden tube 421 in place while tension cable 420 moves inside Bowden tube 421 (e.g., when actuating handle 414 moves relative to primary handle 412). As used herein, a Bowden tube may be understood as a hollow, protective outer cable housing. A Bowden tube may include more than one layer or component. For example, a Bowden tube may include an inner lining and a protective outer covering. Further, an intermediate layer, for example made of a wound or sheathed material such as steel wire, may be interposed between the inner lining and protective outer covering. When used in connection with Bowden tube 421, tension cable 420 and/or the combination of tension cable 420 and Bowden tube 421 may be understood as a Bowden cable.

Referring generally to FIG. 1 and particularly to, e.g., FIGS. 2-9 and 12, tool 100 further comprises rod 121. Rod 121 extends from distal interior wall 111 of chassis 120 toward proximal end 126 of chassis 120. Tension cable 420 is coupled to rod 121. The preceding subject matter of this paragraph characterizes example 35 of the present disclosure, wherein example 35 also includes the subject matter according to example 34, above.

Rod 121 provides a convenient mounting position for tensions cable 420, and also may be beneficially utilized to support various aspects of tool 100 (e.g., slider 110, chassis 120, first jaw 130, second jaw 140, and/or compression spring 190) in desired positions relative to each other.

Referring generally to FIGS. 1-9 and 13, and particularly to, e.g., FIG. 14A, method 500 of using tool 100 to release cable tie 200 fastened around object 201 is disclosed. Tool 100 comprises chassis 120, slider 110 supported by chassis 120, first jaw 130, and second jaw 140. First jaw 130 is supported by chassis 120 and is configured to engage head 210 of cable tie 200 from second side 214 of head 210. Second jaw 140 is coupled to chassis 120 between first jaw 130 and slider 110 and is configured to engage head 210 of cable tie 200 from first side 212 of head 210 that is opposite second side 214. Method 500 comprises (block 502) positioning tool 100 with first jaw 130 proximate second side 214 of head 210 of cable tie 200 and with second jaw 140 proximate first side 212 of head 210 of cable tie 200. Method 500 also comprises (block 504) contacting second side 214 of cable tie 200 with first positioning tooth 150 of first jaw 130. Further, method 500 comprises (block 506), with first positioning tooth 150 of first jaw 130 contacting second side 214 of head 210, moving slider 110 toward distal end 125 of chassis 120 to advance second-opening-tooth distal end 174 of second opening tooth 173 of second jaw 140 inside opening 211 in head 210 of cable tie 200 until second-opening-tooth distal end 174 is in contact with base portion 222 of pawl 220 of cable tie 200. Also, method 500 comprises (block 508) further moving slider 110 toward distal end 125 of chassis 120 to urge second-opening-tooth distal end 174 of second opening tooth 173 of second jaw 140 toward first positioning tooth 150 of first jaw 130 to bias pawl 220 of cable tie 200 out of contact with teeth 233 of cable tie 200. Method 500 further comprises (block 410) removing cable tie 200 from object 201. The preceding subject matter of this paragraph characterizes example 36 of the present disclosure.

Use of tool 100 in connection with method 500 provides for convenient, reliable removal of cable ties. For example, FOD resulting from cable tie removal may be reduced or eliminated. Use of the chassis and slider provide for repeatable, reliable articulation of the first jaw and second jaw to remove cable ties.

Referring generally to FIGS. 1-9 and 13, and particularly to, e.g., FIG. 14A, according to method 500, contacting second side 214 of head 210 of cable tie 200 comprises (block 516) contacting inner surface 217 of opening 211 of cable tie 200 with first-positioning-tooth distal end 152 of first positioning tooth 150 of first jaw 130. The preceding subject matter of this paragraph characterizes example 37 of the present disclosure, wherein example 37 also includes the subject matter according to example 36, above.

Contacting inner surface 217 of opening 211 with first-positioning-tooth distal end 152 of first positioning tooth 150 helps stabilize cable tie 200 with respect to tool 100 while second opening tooth 173 contacts and biases pawl 220, reducing twisting or other motion and helping ensure effective removal of cable tie 200 and reduction of FOD.

Referring generally to FIGS. 1-9 and 13, and particularly to, e.g., FIG. 14A, method 500 also comprises (block 512) urging, with compression spring 190, located between first jaw 130 and second jaw 140, contact surface 114 of slider 110 toward stop surface 122 of chassis 120 after removing cable tie 200 from object 201. The preceding subject matter of this paragraph characterizes example 38 of the present disclosure, wherein example 38 also includes the subject matter according to example 36 or 37, above.

Use of compression spring 190 after removal of cable tie 200 from object 201 places first jaw 130 and second jaw 140 a sufficient distance apart for insertion of a subsequent cable tie to be removed. Use of stop surface 122 and contact surface 114 provides a mechanical limit to a gap or distance at which first jaw 130 is separated from second jaw 140 when no external force counteracts compression spring 190.

Stop surface 122 may be formed integrally with chassis 120 (e.g., as part of stop 123 provided during a molding process forming chassis 120). Contact surface 114 may be formed integrally with slider 110 (e.g., as part of a molding process forming slider 110).

Referring generally to FIGS. 1-13, and particularly to, e.g., FIGS. 14A and 14B, method 500 also comprises (block 520) coupling actuator 416 to chassis 120. Actuator 416 is coupled to actuating handle of actuator assembly 402. Method 500 additionally includes (block 522) coupling thrust portion 417 of actuator assembly 402 to slider 110. Thrust portion 417 is coupled to primary handle 412 of actuator assembly 402. Further, method 500 comprises (block 524) moving actuating handle 414 of actuator assembly 402 relative to primary handle 412 to move slider 110 and chassis 120 with respect to each other. The preceding subject matter of this paragraph characterizes example 39 of the present disclosure, wherein example 39 also includes the subject matter according to any of examples 36 to 38, above.

Use of actuator assembly 402 provides for convenient operation of tool 100 to remove cable tie 200. For example, in some examples, actuator assembly 402 may be disposed on or form part of an existing tool for placing cable tie 200 in place, providing for convenient re-use of the existing tool (as modified by presently disclosed tool 100) for removing cable tie 200 as well. As another example, in some examples, actuator assembly 402 may be remotely located from tool 100, allowing for convenient positioning of tool 100 (e.g., within a small and/or difficult to access space).

Referring generally to FIGS. 1-11 and 13, and particularly to, e.g., FIGS. 14A and 14B, according to method 500, thrust portion 417 of actuator assembly 402 is spaced a fixed distance away from primary handle 412. Actuator assembly 402 comprises rigid housing 812. Thrust portion 417 forms a part of rigid housing 812. Coupling thrust portion 417 of actuator assembly 402 to slider 110 comprises (block 532) inserting thrust portion 417 into recess 115 of slider 110. Coupling actuator 416 to chassis 120 comprises (block 530) engaging projection 124 of chassis 120 with contact portion 804 that is coupled to actuator 416. Method 500 further comprises (block 526) moving actuating handle 414 toward primary handle 412 to move contact portion 804 away from thrust portion 417 of rigid housing 812 to urge distal end 125 of chassis 120 toward slider 110. The preceding subject matter of this paragraph characterizes example 40 of the present disclosure, wherein example 40 also includes the subject matter according to example 39, above.

Use of rigid housing 812, with thrust portion 417 forming a part of rigid housing, provides a rugged, durable actuator assembly 402 providing reliable, consistent performance. Use of recess 115 and projection 124 provide for secure, repeatable mounting of tool 100 to actuator assembly 402.

Referring generally to FIGS. 1-11 and 13, and particularly to, e.g., FIGS. 14A and 14B, according to method 500, inserting thrust portion 417 of rigid housing 812 into recess 115 of slider 110 comprises (block 534) moving contact portion 804 away from thrust portion 417. Inserting thrust portion 417 into recess 115 also comprises (block 536) elastically bending rod 121, which passes through slider 110, away from a neutral position relative to distal end 125 of chassis 120 to displace a portion of chassis 120 relative to slider 110 to expose recess 115 of slider 110. Rod 121 extends from distal interior wall 111 of distal end 125 of chassis 120. Inserting thrust portion 417 into recess 115 additionally comprises (block 538) inserting thrust portion 417 into recess 115, (block 540) moving contact portion 804 toward thrust portion 417, (block 542) urging slider 110 toward distal end 125 of chassis 120, (block 544) causing rod 121 to return to the neutral position, and (block 546) urging slider 110 away from distal end 125 of chassis 120 to engage projection 124 of chassis 120 with contact portion 804. The preceding subject matter of this paragraph characterizes example 41 of the present disclosure, wherein example 41 also includes the subject matter according to example 40, above.

Elastically bending rod 121 during insertion of thrust portion 417 and returning rod 121 allows for convenient addition (and/or removal) of slider 110 while providing a compact size for tool 100. It may be noted that the insertion of thrust portion 417 using elastic bending of rod 121 may occur during an initial manufacturing process or during maintenance, repair, or replacement of components of tool 100.

Referring generally to FIGS. 1-9, 12, and 13, and particularly to, e.g., FIGS. 14A and 14B, according to method 500, coupling thrust portion 417 of actuator assembly 402 to slider 110 comprises (block 550) coupling flexible housing 422 of actuator assembly 402 to slider 110. Coupling actuator 416 to chassis 120 comprises (block 548) coupling tension cable 420, passing through and movable relative to flexible housing 422, to chassis 120. Method 500 further comprises (block 528) moving actuating handle 414 relative to primary handle 412 to move tension cable 420 relative to flexible housing 422 to urge distal end 125 of chassis 120 toward slider 110. The preceding subject matter of this paragraph characterizes example 42 of the present disclosure, wherein example 42 also includes the subject matter according to example 39, above.

Use of flexible housing 422 allows one or more portions of actuator assembly 402 to be varied in position with respect to thrust portion 417 (and slider 110 which thrust portion abuts), allowing tool 100 to be used in a variety of confined spaces that would not allow for use of a rigid housing coupled to tool 100.

Referring generally to FIGS. 1-9, 12, and 13, and particularly to, e.g., FIGS. 14A and 14B, according to method 500, moving actuating handle 414 relative to primary handle 412 to move tension cable 420 relative to flexible housing 422 to urge distal end 125 of chassis 120 toward slider 110 comprises (block 552) increasing tension of tension cable 420. The preceding subject matter of this paragraph characterizes example 43 of the present disclosure, wherein example 43 also includes the subject matter according to example 42, above.

Moving actuating handle 414 to increase tension of tension cable 420 provides a reliable, convenient method of urging distal end 125 of chassis toward slider 110 to actuate first jaw 130 and second jaw 140 relative to each other. Release of tension in tension cable 420 allows a counteracting force (e.g., provided from compression spring 190) to urge first jaw 130 and second jaw 140 away from each other after cable tie 200 has been removed.

Referring generally to FIGS. 1-9, and particularly to, e.g., FIGS. 14A and 14B, according to method 500, first jaw 130 comprises first pair of opposing jaw wings 139 that extend from first base 157 of first jaw 130. Second jaw 140 comprises second pair of opposing jaw wings 149 that extend from second base 170 of second jaw 140. Moving slider 110 relative to chassis 120 comprises (block 514) moving first jaw 130 and second jaw 140 toward each other until at least one of first pair of opposing jaw wings 139 contacts slider 110 or second pair of opposing jaw wings 149 contacts distal interior wall 111 of chassis 120. The preceding subject matter of this paragraph characterizes example 44 of the present disclosure, wherein example 44 also includes the subject matter according to any one of examples 36 to 43, above.

Use of first pair of opposing jaw wings 139 to contact slider 110 and/or second pair of opposing jaw wings 149 to contact distal interior wall 111 of chassis 120 provides a positive stop to prevent first jaw 130 and second jaw 140 from getting too close to each other during releasing of cable tie 200, which might remove portions from head 210 (e.g., pawl 220) of cable tie 200 resulting in debris and/or resulting in inability to re-use cable tie 200 after removal.

Examples of the present disclosure may be described in the context of aircraft manufacturing and service method 1100 as shown in FIG. 15 and aircraft 1102 as shown in FIG. 16. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 16, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A tool for releasing a cable tie that comprises a head, the tool comprising:
   a chassis, comprising a distal end, a proximal end opposite the distal end, and a distal interior wall, facing the proximal end of the chassis;
   a slider, comprising a slider opening, wherein the slider is coupled to the chassis;
   a first jaw, coupled to the chassis and configured to engage the head of the cable tie from a second side of the head, wherein the first jaw is located between the distal interior wall of the chassis and the slider the first jaw comprising a first-jaw opening;
   a second jaw, coupled to the chassis and configured to engage the head of the cable tie from a first side of the head, opposite the second side, wherein the second jaw is located between the first jaw and the slider, the second jaw comprising a second-jaw opening; and
   a compression spring, located between the first jaw and the second jaw;
   wherein, when the slider and the chassis are moved relative to each other, the first jaw is stationary relative to the chassis and the second jaw moves relative to the chassis and is stationary relative to the slider; and
   a rod, extending from the distal interior wall of the chassis toward the proximal end of the chassis, wherein the rod extends through the first-jaw opening of the first jaw and the second-iaw opening of the second jaw.

2. The tool according to claim 1, wherein:
   the first jaw comprises a first base and a first positioning tooth, extending from the first base toward the second jaw;
   the first positioning tooth comprises a first-positioning-tooth distal end, spaced away from the first base;
   the second jaw comprises a second base and a second positioning tooth, extending from the second base toward the first jaw; and
   the second positioning tooth comprises a second-positioning-tooth distal end, spaced away from the second base.

3. The tool according to claim 2, wherein:
   the first jaw further comprises a first opening tooth, extending from the first base toward the second jaw;
   the first opening tooth comprises a first-opening-tooth distal end, spaced away from the first base;
   the second jaw further comprises a second opening tooth, extending from the second base toward the first jaw;
   the second opening tooth comprises a second-opening-tooth distal end, spaced away from the second base;
   the first opening tooth of the first jaw is located opposite the second positioning tooth of the second jaw; and
   the second opening tooth of the second jaw is located opposite the first positioning tooth of the first jaw.

4. The tool according to claim 3, wherein:
the first jaw comprises a first pair of opposing jaw wings, extending from the first base; and
the second jaw comprises a second pair of opposing jaw wings, extending from the second base.

5. The tool according to claim 4, wherein at least one of:
the first pair of opposing jaw wings of the first jaw is configured to contact the slider when the slider is biased toward the distal end of the chassis with a force exceeding that of the compression spring; or
the second pair of opposing jaw wings of the second jaw is configured to contact the distal interior wall of the chassis when the slider is biased toward the distal end of the chassis with a force exceeding that of the compression spring.

6. The tool according to claim 1, wherein:
the slider further comprises a recess;
the chassis further comprises a proximal interior wall, located opposite the distal interior wall; and
the chassis further comprises a projection, extending from the proximal interior wall toward the distal interior wall.

7. The tool according to claim 6, wherein the recess of the slider comprises a thrust wall that is perpendicular to the rod, coupled to the chassis, and that faces the proximal interior wall of the chassis.

8. The tool according to claim 6, wherein the chassis further comprises a shoulder, extending from the proximal interior wall toward the distal interior wall and spaced a distance (d) from the projection.

9. The tool according to claim 1, wherein the first jaw is rotationally fixed with respect to the chassis and the second jaw is rotationally fixed with respect to the slider.

10. The tool according to claim 9, wherein:
the chassis further comprises a chassis pocket, formed in the distal interior wall of the chassis; and
the first jaw comprises a first jaw tab, received by the chassis pocket to rotationally fix the first jaw with respect to the chassis.

11. The tool according to claim 9, wherein:
the slider further comprises an exterior surface, facing the distal interior wall of the chassis;
the slider further comprises a slider pocket, recessed relative to the exterior surface; and
the second jaw comprises a second jaw tab, received by the slider pocket to rotationally fix the second jaw with respect to the slider.

12. The tool according to claim 1, wherein:
the rod, coupled to the chassis, is inside the slider opening; and
the slider is slidable along the rod.

13. The tool according to claim 12, wherein:
the chassis further comprises a stop, comprising a stop surface perpendicular to the rod;
the slider further comprises a contact surface, parallel to the stop surface; and
the compression spring biases the slider toward the stop such that the contact surface of the slider abuts the stop surface.

14. The tool according to claim 1, wherein the first jaw comprises a first abutment surface, contacting the distal interior wall of the chassis.

15. The tool according to claim 1, wherein:
the slider comprises an exterior surface, facing the distal interior wall of the chassis; and
the second jaw comprises a second abutment surface that abuts the exterior surface of the slider.

16. The tool according to claim 1, wherein:
the chassis further comprises a proximal interior wall, located opposite the distal interior wall;
the tool further comprises a rod, having a central axis, wherein the rod extends from the distal interior wall of the chassis toward the proximal end of the chassis; and
the central axis does not pass through the proximal interior wall of the chassis.

17. The tool according to claim 1, wherein the first jaw is identical to the second jaw.

18. A system for releasing a cable tie that comprises a head, the system comprising:
a tool, comprising:
a chassis, comprising:
a distal end;
a proximal end, opposite the distal end; and
a distal interior wall, facing the proximal end of the chassis;
a slider, comprising a slider opening, wherein the slider is coupled to the chassis;
a first jaw, coupled to the chassis and configured to engage the head of the cable tie from a second side of the head, wherein the first jaw is located between the distal interior wall of the chassis and the slider, the first jaw comprising a first-jaw opening;
a second jaw, coupled to the chassis and configured to engage the head of the cable tie from a first side of the head, opposite the second side, wherein the second jaw is located between the first jaw and the slider, the second jaw comprising a second-jaw opening;
a compression spring, located between the first jaw and the second jaw; and
a rod, extending from the distal interior wall of the chassis toward the proximal end of the chassis, wherein the rod extends through the first jaw opening of the first jaw and the second-jaw opening of the second jaw; and
an actuator assembly, comprising:
a primary handle;
an actuating handle that is movable relative to the primary handle;
an actuator, coupled to the actuating handle and to the chassis of the tool; and
a thrust portion, abutting the slider, wherein the actuator is movable relative to the thrust portion; and
wherein, when the actuating handle is moved relative to the primary handle, the actuator moves relative to the thrust portion, the slider and the chassis move relative to each other, the first jaw is stationary relative to the chassis and the second jaw moves relative to the chassis and is stationary relative to the slider.

19. The tool according to claim 18, wherein the first jaw is identical to the second jaw.

20. A tool for releasing a cable tie that comprises a head, the tool comprising:
a chassis, comprising a distal end, a proximal end opposite the distal end, and a distal interior wall, facing the proximal end of the chassis;
a slider, comprising a slider opening, wherein the slider is coupled to the chassis;
a first jaw, coupled to the chassis and configured to engage the head of the cable tie from a second side of the head, wherein the first jaw is located between the distal interior wall of the chassis and the slider;
a second jaw, coupled to the chassis and configured to engage the head of the cable tie from a first side of the head, opposite the second side, wherein the second jaw is located between the first jaw and the slider; and a compression spring, located between the first jaw and the second jaw; and wherein:

when the slider and the chassis are moved relative to each other, the first jaw is stationary relative to the chassis and the second jaw moves relative to the chassis and is stationary relative to the slider;

the first jaw comprises:
- a first base and a first positioning tooth, extending from the first base toward the second jaw;
- a first opening tooth, extending from the first base toward the second jaw and comprising a first-opening-tooth distal end, spaced away from the first base; and
- a first pair of opposing jaw wings, extending from the first base;

the first positioning tooth comprises a first-positioning-tooth distal end, spaced away from the first base;

the second jaw comprises:
- a second base and a second positioning tooth, extending from the second base toward the first jaw;
- a second opening tooth, extending from the second base toward the first jaw and comprising a second-opening-tooth distal end, spaced away from the second base; and
- a second pair of opposing jaw wings, extending from the second base;

the second positioning tooth comprises a second-positioning-tooth distal end, spaced away from the second base;

the first opening tooth of the first jaw is located opposite the second positioning tooth of the second jaw;

the second opening tooth of the second jaw is located opposite the first positioning tooth of the first jaw; and at least one of:
- the first pair of opposing jaw wings of the first jaw is configured to contact the slider when the slider is biased toward the distal end of the chassis with a force, exceeding that of the compression spring; or
- the second pair of opposing jaw wings of the second jaw is configured to contact the distal interior wall of the chassis when the slider is biased toward the distal end of the chassis with a force, exceeding that of the compression spring.

* * * * *